(12) United States Patent
Aoki et al.

(10) Patent No.: US 12,543,390 B2
(45) Date of Patent: Feb. 3, 2026

(54) RADIATION IMAGING DEVICE WITH SIGNAL CONNECTION WIRING BETWEEN READING CHIPS

(71) Applicants: NATIONAL UNIVERSITY CORPORATION SHIZUOKA UNIVERSITY, Shizuoka (JP); ANSeeN Inc., Hamamatsu (JP)

(72) Inventors: Toru Aoki, Hamamatsu (JP); Katsuyuki Takagi, Hamamatsu (JP); Akifumi Koike, Hamamatsu (JP)

(73) Assignees: NATIONAL UNIVERSITY CORPORATION SHIZUOKA UNIVERSITY (JP); ANSeeN Inc. (JP)

( * ) Notice: Subject to any disclaimer, the term of this patent is extended or adjusted under 35 U.S.C. 154(b) by 179 days.

(21) Appl. No.: 18/549,293

(22) PCT Filed: Mar. 11, 2021

(86) PCT No.: PCT/JP2021/009870
§ 371 (c)(1),
(2) Date: Sep. 6, 2023

(87) PCT Pub. No.: WO2022/190321
PCT Pub. Date: Sep. 15, 2022

(65) Prior Publication Data
US 2024/0145521 A1    May 2, 2024

(51) Int. Cl.
*H10F 39/18* (2025.01)
*G01T 1/24* (2006.01)
(52) U.S. Cl.
CPC .......... *H10F 39/1895* (2025.01); *G01T 1/247* (2013.01)
(58) Field of Classification Search
CPC .................... H10F 39/1895; G01T 1/247
See application file for complete search history.

(56) References Cited

U.S. PATENT DOCUMENTS

| 5,629,524 A | 5/1997 | Stettner et al. .......... 250/370.99 |
| 8,120,683 B1 | 2/2012 | Tumer et al. ................. 348/295 |

(Continued)

FOREIGN PATENT DOCUMENTS

| CN | 103884978 A | 6/2014 |
| EP | 3734660 A | 11/2020 |

(Continued)

OTHER PUBLICATIONS

English translation of the International Preliminary Report on Patentability (IPRP) (Chapter 1 or II of the PCT Treaty) mailed Sep. 21, 2023 with a Notification from the International Bureau (Form PCT/IB/338) in corresponding PCT International Application No. PCT/JP2021/009870.

(Continued)

*Primary Examiner* — Blake C Riddick
(74) *Attorney, Agent, or Firm* — OSTROLENK FABER LLP

(57) ABSTRACT

A radiation imaging device includes charge generation chips configured to generate charges, reading chips configured to output a digital value based on the charges, and a circuit board configured to have the reading chips arranged thereon. The charge generation chips each have a charge output surfaces including a first output region facing the reading chip and a second output region facing a different reading chip. The reading chips each have signal input/output electrodes. The charge generation chips each have signal connection wirings extending from the first output region to the second output region and electrically connecting the signal input/output electrodes of the reading chip to the signal input/output electrodes of the different reading chip.

8 Claims, 14 Drawing Sheets

(56) References Cited

U.S. PATENT DOCUMENTS

| | | | | |
|---|---|---|---|---|
| 8,229,067 | B2* | 7/2012 | Matsuura | A61B 6/583 |
| | | | | 345/589 |
| 9,113,821 | B2* | 8/2015 | Matsumoto | A61B 6/107 |
| 9,500,755 | B2* | 11/2016 | Nonaka | H04N 23/30 |
| 2003/0218120 | A1* | 11/2003 | Shibayama | H10F 39/811 |
| | | | | 250/214.1 |
| 2005/0139757 | A1* | 6/2005 | Iwanczyk | G01T 1/2928 |
| | | | | 257/E31.015 |
| 2006/0065836 | A1* | 3/2006 | Tsuchiya | G01T 1/1648 |
| | | | | 250/363.1 |
| 2009/0114919 | A1* | 5/2009 | Kawahito | H10F 39/014 |
| | | | | 257/E27.15 |
| 2009/0200478 | A1* | 8/2009 | Bethke | G01T 1/247 |
| | | | | 250/370.08 |
| 2009/0238324 | A1* | 9/2009 | Oikawa | A61B 6/4441 |
| | | | | 378/7 |
| 2010/0187410 | A1* | 7/2010 | Lijima | H04N 25/671 |
| | | | | 250/252.1 |
| 2011/0298079 | A1* | 12/2011 | Kawahito | H10F 39/014 |
| | | | | 257/431 |
| 2012/0193545 | A1* | 8/2012 | Tkaczyk | G01T 1/2928 |
| | | | | 250/370.08 |
| 2012/0217413 | A1* | 8/2012 | Kameshima | H04N 25/78 |
| | | | | 250/394 |
| 2012/0223241 | A1* | 9/2012 | Kim | H10F 39/195 |
| | | | | 250/394 |
| 2013/0032723 | A1* | 2/2013 | Lee | G21K 4/00 |
| | | | | 250/369 |
| 2016/0066876 | A1* | 3/2016 | Yamazaki | A61B 6/03 |
| | | | | 250/336.1 |
| 2017/0040371 | A1* | 2/2017 | Izuhara | H10F 39/804 |
| 2018/0295294 | A1* | 10/2018 | Kameshima | H05G 1/44 |
| 2019/0260952 | A1* | 8/2019 | Lee | H04N 23/11 |
| 2020/0145592 | A1* | 5/2020 | Iwakiri | A61B 6/56 |
| 2020/0158841 | A1* | 5/2020 | Parascandola | G01S 17/36 |
| 2021/0084249 | A1* | 3/2021 | Nakazawa | H10F 39/811 |

FOREIGN PATENT DOCUMENTS

| | | |
|---|---|---|
| JP | H03-150487 A | 6/1991 |
| JP | 2003-264280 A | 9/2003 |
| JP | 2007-155562 A | 6/2007 |
| JP | 2007-524234 A | 8/2007 |
| JP | 2009-186475 A | 8/2009 |
| JP | 2011-091770 A | 5/2011 |
| JP | 2011-226902 A | 11/2011 |
| JP | 2012-009607 A | 1/2012 |
| JP | 2012-185159 A | 9/2012 |
| JP | 2012-198195 A | 10/2012 |
| JP | 2015-216334 A | 12/2015 |
| TW | 201946085 A | 12/2019 |
| WO | WO 2005/065333 A2 | 7/2005 |
| WO | WO 2014/192471 A1 | 12/2014 |
| WO | WO 2019/004230 A1 | 1/2019 |

OTHER PUBLICATIONS

Extended European Search Report dated Nov. 28, 2024 issued in corresponding European Patent Application No. 21930174.4.

International Search Report mailed Jun. 8, 2021 in corresponding International Patent Application No. PCT/JP2021/009870.

* cited by examiner

RADIATION IMAGING DEVICE WITH SIGNAL CONNECTION WIRING BETWEEN READING CHIPS

CROSS-REFERENCE TO RELATED APPLICATIONS

The present application is a 35 U.S.C. §§ 371 national stage application of International Application No. PCT/JP2021/009870 filed Mar. 11, 2021, the contents of which are incorporated herein by reference.

TECHNICAL FIELD

The present invention relates to a radiation imaging device.

BACKGROUND ART

A technology of detecting radiation is being developed. A radiation detection technology is expected to be applied to the medical field, the industrial field, the security field, and the like. Regarding a device for detecting radiation, there is a radiation imaging device for obtaining a radiation image. For example, the radiation imaging device disclosed in Patent Literature 1 includes radiation detection elements and integrated circuit elements. The radiation detection elements are components independent from the integrated circuit elements. The radiation detection elements are arranged on the integrated circuit elements. Further, rear surfaces of the radiation detection elements and main surfaces of the integrated circuit elements are electrically connected to each other through a plurality of electrodes. For example, Patent Literature 2 also discloses a sensor employing a structure in which detection elements and circuit elements are layered.

CITATION LIST

Patent Literature

[Patent Literature 1] Japanese Unstudied Patent Publication No. 2007-155562
[Patent Literature 2] Japanese Unstudied Patent Publication No. 2012-9607

SUMMARY OF INVENTION

Technical Problem

In a technical field of radiation imaging devices, it is desired that areas of effective pixel regions be increased. However, it is difficult to increase the area of each of radiation detectors constituting a radiation imaging device. Hence, a structure for expanding effective pixel regions by arranging a plurality of radiation detectors on a circuit board is being studied.

When a structure in which a plurality of radiation detectors are arranged on a circuit board is employed, there is a need to repeat work of attaching a radiation detector to the circuit board a plurality of times in a step of manufacturing a radiation imaging device. If the number of times of repeating such attachment work increases, the likelihood of producing a radiation detector which does not function normally among a plurality of radiation detectors also increases. Namely, in order to increase the areas of effective pixel regions, there is a need to increase the number of radiation detectors. However, if the number of radiation detectors increases, the likelihood of occurrence of defective attachment work also increases. As a result, a yield tends to be reduced as the areas of effective pixel regions become larger.

An object of the present invention is to provide a radiation imaging device capable of curbing decrease in yield.

Solution to Problem

A radiation imaging device according to an aspect of the present invention includes charge generation chips configured to generate charges corresponding to an energy or the number of particles of incident radiation; first reading chips configured to be electrically connected to the charge generation chips and output a digital value based on the charges received from the charge generation chips; second reading chips configured to be electrically connected to the charge generation chips, output a digital value based on the charges received from the charge generation chips, and be adjacent to the first reading chips; and a circuit board configured to have the first reading chips and the second reading chips arranged thereon. The charge generation chips each have a charge output surface including a first output region facing the first reading chip and a second output region facing the second reading chip. The first reading chips each have a first reading surface facing the charge output surface and first signal input/output electrodes provided on the first reading surface. The second reading chips each have a second reading surface facing the charge output surface and second signal input/output electrodes provided on the second reading surface. The charge generation chips each have signal connection wirings extending from the first output region to the second output region on the charge output surface and electrically connecting the first signal input/output electrodes to the second signal input/output electrodes.

The first and second reading chips of the radiation imaging device each have the first and second signal input/output electrodes provided on the first and second reading surfaces facing the charge generation chips. The first signal input/output electrodes are connected to the second signal input electrodes through the signal connection wirings provided in the charge generation chips. Therefore, the first reading chips can be connected to the second reading chips by simply arranging the charge generation chips in a manner of straddling the first and second reading chips. As a result, since the first reading chips can be easily connected to the second reading chips, occurrence of defective work during assembling of a radiation imaging device is curbed. Therefore, decrease in yield can be curbed.

In the radiation imaging device according to the aspect, the charge generation chips each may have a plurality of charge output electrodes provided on the charge output surface. The first reading chips each may have a plurality of charge reading electrodes provided on the first reading surface, facing the charge output electrodes, and electrically connected to the charge output electrodes. According to this constitution, connection between the first reading chips and the second reading chips, connection between the charge generation chips and the first reading chips, and connection between the charge generation chips and the second reading chips can be performed by simply arranging the charge generation chips in a manner of straddling the first and second reading chips.

In the radiation imaging device according to the aspect, the charge generation chips each may include the charge output surface provided with the signal connection wirings and the charge output electrodes and have a semiconductor detection portion outputting the charges from the charge output electrodes. The first reading chips each may include the first reading surface provided with the first signal input/output electrodes and the charge reading electrodes and have a lead-out portion generating the digital value based on the charges received from the semiconductor detection portion. In this constitution, the charge output electrodes provided in the semiconductor detection portion regulate effective pixel regions. Further, arrangement of the charge output electrodes of the charge generation chips and arrangement of the charge reading electrodes of the reading chips coincide with each other. As a result, there is no need to provide a constitution for causing arrangement of the charge output electrodes to match arrangement of the charge reading electrodes. Therefore, the structure of the radiation imaging device can be simplified.

In the radiation imaging device according to the aspect, the charge generation chips each may have a charge rewiring portion including the charge output surface provided with the signal connection wirings and the charge output electrodes, and a semiconductor detection portion outputting the charges to the charge rewiring portion via a plurality of pixel electrodes separated from each other. The first reading chips each may include the first reading surface provided with the first signal input/output electrodes and the charge reading electrodes and have a lead-out portion generating the digital value based on the charges received from the charge rewiring portion. Arrangement intervals between the pixel electrodes may differ from arrangement intervals between the charge output electrodes. In this constitution, the pixel electrodes provided in the semiconductor detection portion regulate the effective pixel regions. Further, the charge rewiring portion causes arrangement of the pixel electrodes and arrangement of the charge reading electrodes to match each other. As a result, arrangement of the pixel electrodes regulating the effective pixel regions is not limited by the arrangement of the charge reading electrodes. Therefore, the degree of freedom of arrangement of the pixel electrodes regulating the effective pixel regions can be enhanced.

In the radiation imaging device according to the aspect, the charge generation chips each may include the charge output surface provided with the signal connection wirings and the charge output electrodes and have a semiconductor detection portion outputting the charges from the charge output electrodes. The first reading chips each may have a reading rewiring portion including the first reading surface provided with the first signal input/output electrodes and the charge reading electrodes, and a lead-out portion generating the digital value on the basis of the charges received from the reading rewiring portion via a plurality of rewiring electrodes separated from each other. Arrangement intervals between the rewiring electrodes may differ from arrangement intervals between the charge reading electrodes. In this constitution, arrangement of the charge output electrodes provided in the semiconductor detection portion regulates the effective pixel regions. The reading rewiring portion causes arrangement of the charge reading electrodes facing the charge output electrodes and arrangement of the rearranging electrodes to match each other. As a result, arrangement of the charge output electrodes regulating the effective pixel regions is not limited by the arrangement of the rearranging electrodes. Therefore, the degree of freedom of arrangement of the charge output electrodes regulating the effective pixel regions can be enhanced.

In the radiation imaging device according to the aspect, the charge generation chips each may have a charge rewiring portion including the charge output surface provided with the signal connection wirings and the charge output electrodes, and a semiconductor detection portion outputting the charges to the charge rewiring portion via a plurality of pixel electrodes separated from each other. The first reading chips each may have a reading rewiring portion including the first reading surface provided with the first signal input/output electrodes and the charge reading electrodes, and a lead-out portion generating the digital value on the basis of the charges received from the reading rewiring portion via a plurality of rewiring electrodes separated from each other. Arrangement intervals between the pixel electrodes may differ from arrangement intervals between the charge output electrodes. Arrangement intervals between the rewiring electrodes may differ from arrangement intervals between the charge reading electrodes. In this constitution, the pixel electrodes provided in the semiconductor detection portion regulate the effective pixel regions. Further, the charge rewiring portion causes arrangement of the pixel electrodes and arrangement of the charge reading electrodes to match each other. Moreover, the reading rewiring portion causes arrangement of the charge reading electrodes facing the charge output electrodes and arrangement of the rearranging electrodes to match each other. As a result, arrangement of the pixel electrodes regulating the effective pixel regions is not limited by the arrangement of the rearranging electrodes. Therefore, the degree of freedom of arrangement of the pixel electrodes regulating the effective pixel regions can be enhanced.

The radiation imaging device according to the aspect may further include third reading chips configured to be electrically connected to the charge generation chips, output a digital value based on the charges received from the charge generation chips, and be adjacent to the second reading chips. The third reading chips each may have a third reading surface facing the charge output surface and third signal input/output electrodes provided on the third reading surface. The charge output surfaces of the charge generation chips each may further include a third output region facing a third reading portion. The second reading chips each may further have second additional signal input/output electrodes provided on the second reading surface. The charge generation chips each may further have additional signal connection wirings extending from the second output regions to the third output regions and electrically connecting the second additional signal input/output electrodes to the third signal input/output electrodes. According to this constitution, three reading chips can be electrically connected to each other by one charge generation chip.

The radiation imaging device according to the aspect may further include third reading chips configured to be electrically connected to the charge generation chips, output a digital value based on the charges received from the charge generation chips, and be adjacent to the second reading chips. The third reading chips each may have a third reading surface facing the charge output surface and third signal input/output electrodes provided on the third reading surface. The charge output surfaces of the charge generation chips each may further include a third output region facing a third reading portion. The signal connection wirings may be provided throughout the first output regions, the second output regions, and the third output regions, and electrically connect the first signal input/output electrodes, the second signal input/output electrodes, and the third signal input/output electrodes to each other. Also in this constitution, three reading chips can be electrically connected to each other by one charge generation chip.

Advantageous Effects of Invention

According to the present invention, a radiation imaging device capable of curbing decrease in yield is provided.

DESCRIPTION OF EMBODIMENTS

Figure 1:
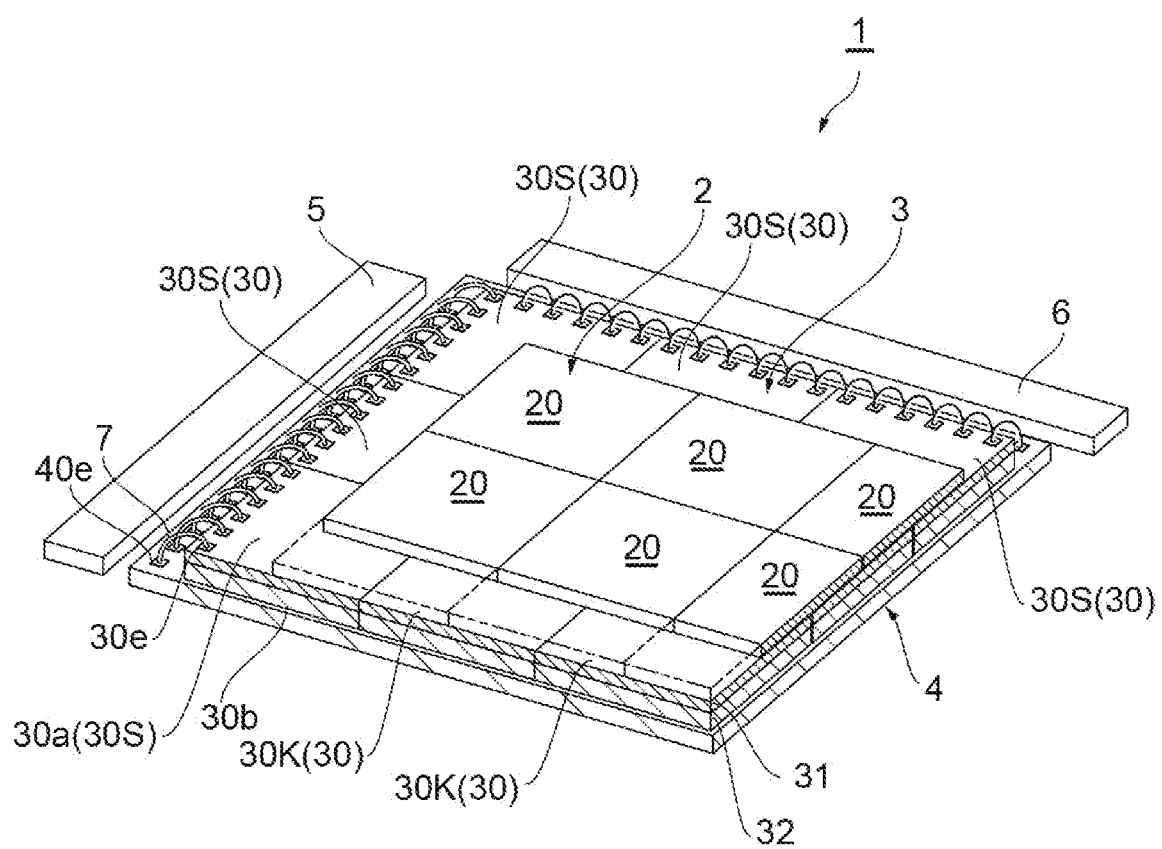
FIG. 1 is a perspective view of a radiation imaging device according to a first embodiment.

A radiation imaging device 1 illustrated in FIG. 1 acquires a two-dimensional image based on radiation arriving from an inspection target. For example, radiation indicates gamma rays, X-rays, alpha rays, beta rays, and the like. The radiation imaging device 1 has a charge generator 2, a reader 3, and a circuit board 4. The charge generator 2 is arranged on the reader 3. The charge generator 2 includes a plurality of charge generation chips 20. The charge generation chips 20 are arranged on the reader 3 in a two-dimensional shape. The charge generator 2 outputs charges corresponding to incident radiation to the reader 3.

The reader 3 is arranged on the circuit board 4. The reader 3 includes a plurality of reading chips 30. The reading chips 30 are arranged on the circuit board 4 in a two-dimensional shape. The reader 3 receives a control signal from a controller 5 via the circuit board 4. The reader 3 generates a pixel signal corresponding to charges. In addition, the reader 3 outputs an image signal to an image generator 6 via the circuit board 4. Specifically, the reader 3 outputs an image signal to the circuit board 4 via signal input/output electrodes 30e. The signal input/output electrodes 30e are provided on an outer circumferential portion of the reader 3. First end portions of bonding wires 7 are connected to the signal input/output electrodes 30e. Second end portions of the bonding wires 7 are connected to substrate electrodes 40e of the circuit board 4.

Inputting and outputting of a signal between the reader 3 and the circuit board 4 are performed through only the signal input/output electrodes 30e having the bonding wires 7 connected thereto. Namely, the reading chips 30 do not include bump electrodes provided on reading chip rear surfaces 30b. The reading chip rear surfaces 30b are flat surfaces provided with no electrodes. The term "flat surface" stated in the present embodiment means that electrodes or any other electrical structures are not provided. Therefore, inputting and outputting of a signal in the reading chips 30 with respect to the outside are limited to only from reading chip front surfaces 30a. Namely, inputting and outputting of a signal the reading chips 30 with respect to the outside are not performed from the reading chip rear surfaces 30b.

However, the reading chips 30 having the bonding wires 7 connected thereto are only those arranged at the outermost circumference in the reader 3. In the following description, the reading chips 30 arranged at the outermost circumference in the reader 3 will be referred to as outer reading chips 30S. Namely, the bonding wires 7 are connected to the outer reading chips 30S. On the other hand, the reading chips 30 arranged in a region surrounded by the outer reading chips 30S will be referred to as inner reading chips 30K. Namely, the bonding wires 7 are not connected to the inner reading chips 30K. In the following description, the terms, the outer reading chips 30S and the inner reading chips 30K, will be used, as necessary. When there is no particular need to distinguish therebetween, they will simply be referred to as the reading chips 30.

The first reading chip and the second reading chip stated in the claims mean reading chips adjacent to each other. Therefore, there may be a case in which the outer reading chip 30S is the first reading chip and the inner reading chip 30K is the second reading chip. In addition, there may be a case in which the outer reading chip 30S is the first reading chip and a different outer reading chip 30S adjacent to the outer reading chip 30S is the second reading chip. Moreover, there may be a case in which the inner reading chip 30K is the first reading chip and a different inner reading chip 30K adjacent to the inner reading chip 30K is the second reading chip.

The inner reading chips 30K perform inputting and outputting of a signal via the outer reading chips 30S. For example, the inner reading chip 30K illustrated in FIG. 1 outputs an image signal via an adjacent outer reading chip 30S. There may be a case in which the inner reading chip 30K is connected to an adjacent outer reading chip 30S via a different adjacent inner reading chip 30K.

Figure 2:
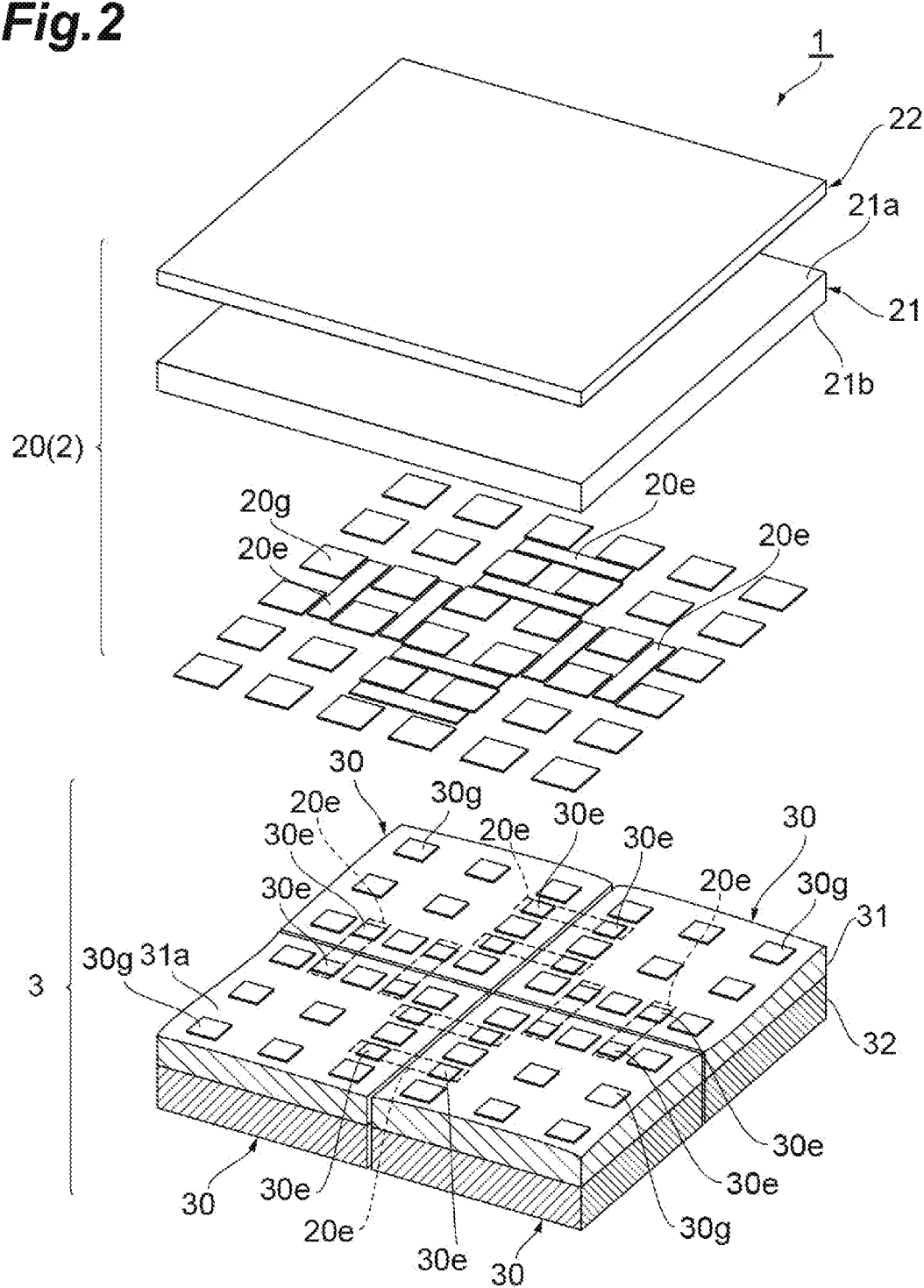
FIG. 2 is an exploded perspective view illustrating a charge generation chip and a reading chip in FIG. 1.

This connection constitution can be realized by a constitution in which the signal input/output electrodes 30e (first signal input/output electrodes) of the reading chip 30 illustrated in FIG. 2 and the signal input/output electrodes 30e (second signal input/output electrodes) of a different reading chip 30 adjacent to the reading chip 30 are electrically connected to each other. Namely, the signal input/output electrodes 30e of the reading chip 30 on one side are connected to the signal input/output electrodes 30e of the reading chip 30 on the other side through signal connection wirings 20e. The signal connection wirings 20e are provided in the charge generation chips 20. Namely, the charge generation chips 20 are arranged on the reading chips 30 adjacent to each other in a manner of straddling. As a result, the signal connection wirings 20e provided in the charge generation chips 20 electrically connect the reading chip 30 on one side to the reading chip 30 on the other side. In addition to a first function of receiving radiation and outputting charges, the charge generation chips 20 of the radiation imaging device 1 according to the present embodiment also has a second function of electrically connecting the reading chips 30 adjacent to each other.

<Charge Generation Chip>

The charge generation chips 20 generate charges corresponding to incident radiation. The charge generation chips 20 output charges to the reading chips 30. The shapes of the charge generation chips 20 and the reading chips 30 are plate shapes. In a plan view, the shapes of the charge generation chips 20 may coincide with the shapes of the reading chips 30. In addition, the shapes of the charge generation chips 20 may differ from the shapes of the reading chips 30. In the following description, it is assumed that the planar shapes of the charge generation chips 20 are the same as the planar shapes of the reading chips 30.

The charge generation chips 20 are arranged on the reading chips 30. The charge generation chips 20 are each arranged on two or more reading chips 30. In the example illustrated in FIG. 2, one charge generation chip 20 straddles four reading chips 30. For example, end surfaces of the charge generation chips 20 are misaligned with respect to end surfaces of the reading chips 30. Specifically, the end surfaces of the charge generation chips 20 are misaligned with respect to the end surfaces of the reading chips 30 by half the one side of the charge generation chips 20. According to such a constitution, charges generated by the charge generation chips 20 move to each of the four reading chips 30.

Figure 3:
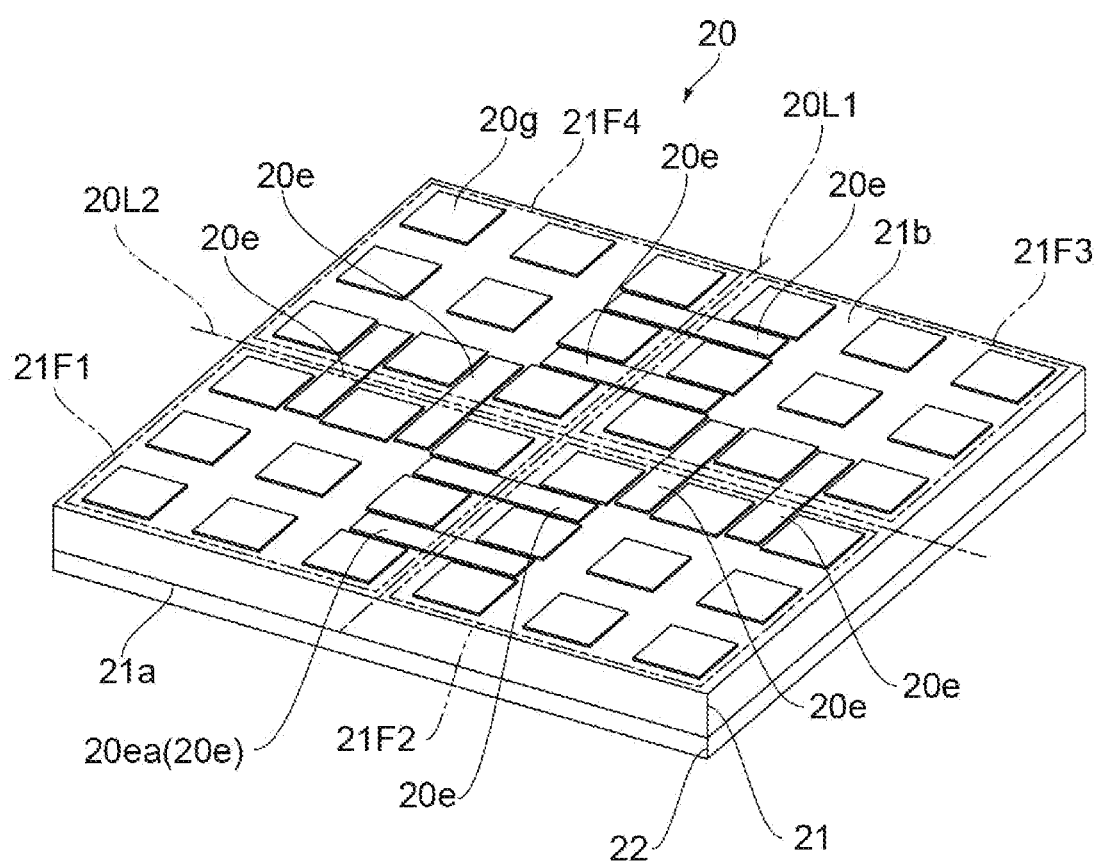
FIG. 3 is a perspective view illustrating a charge output surface of the charge generation chip in FIG. 1.

When the charge generation chips 20 are arranged in a manner of straddling the four reading chips 30, charge output surfaces 21b of the charge generation chips 20 include four output regions. As illustrated in FIG. 3, the charge output surfaces 21b each include an output region 21F1 (first output region), an output region 21F2 (second output region), an output region 21F3 (third output region), and an output region 21F4 (fourth output region).

FIG. 2 will be referred to again. The charge generation chips 20 each have a semiconductor detection portion 21, a control electrode portion 22, charge output electrodes 20g, and the signal connection wirings 20e.

The semiconductor detection portion 21 generates electron-hole pairs (charge pairs) by means of received X-rays. Namely, the semiconductor detection portion 21 converts received radiation into a current signal (charge signal) corresponding to the energy thereof. The planar shape of the semiconductor detection portion 21 is a rectangular shape. For example, the size of the semiconductor detection portion 21 is approximately 9.6 mm×9.6 mm. The semiconductor detection portion 21 has a semiconductor incident surface 21a receiving radiation such as X-rays, and the charge output surface 21b outputting charges. Signals based on charges are provided from the charge output surfaces 21b to the reading chips 30. For example, a Cd(Zn)Te charge generator, a Si charge generator, a Ge charge generator, a GaAs charge generator, a GaN charge generator, a TlBr charge generator, or the like may be utilized as the semiconductor detection portion 21. In addition, a device including a scintillator and a photodetector may be used as the semiconductor detection portion 21. The scintillator converts X-rays into light. The photodetector converts light generated by the scintillator into charges.

The control electrode portion 22 is provided on the semiconductor incident surface 21a. The control electrode portion 22 covers the entire surface of the semiconductor incident surface 21a. In a plan view, the planar shape of the control electrode portion 22 coincides with the planar shape of the semiconductor incident surface 21a. The control electrode portion 22 forms an electric field in a region having the semiconductor detection portion 21 arranged therein. An electric field determines a direction in which charges generated in the semiconductor detection portion 21 move. An electric field generated by the control electrode portion 22 moves charges toward the charge output surface 21b inside the semiconductor detection portion 21.

FIG. 3 is a perspective view of the charge generation chip 20 viewed from the side of the charge output surface 21b. As illustrated in FIG. 3, a plurality of charge output electrodes 20g are provided on the charge output surface 21b. The charge output electrodes 20g may be bumps. The plurality of charge output electrodes 20g are arranged in a lattice shape. In the charge generation chip 20 illustrated in FIG. 3, six charge output electrodes 20g are arrayed in a vertical direction, and six charge output electrodes 20g are also arrayed in a transverse direction. Namely, the charge generation chip 20 illustrated in FIG. 3 has 36 charge output electrodes 20g. One charge output electrode 20g corresponds to one pixel G (refer to FIG. 5). Therefore, regions having the charge output electrodes 20g arranged therein are effective pixel regions. Gaps are formed between the charge output electrodes 20g adjacent to each other. The gaps expose the charge output surface 21b.

A plurality of signal connection wirings 20e are provided on the charge output surface 21b. The signal connection wirings 20e are provided between the charge output electrodes 20g. The charge generation chip 20 illustrated in FIG. 3 has eight signal connection wirings 20e. The signal connection wirings 20e straddle a centerline 20L1 in a plan view of the charge generation chip 20. Namely, the output regions having first end portions of the signal connection wirings 20e arranged therein and the output regions having second end portions of the signal connection wirings 20e arranged therein differ from each other. For example, signal connection wirings 20ea illustrated in FIG. 3 extend from the output region 21F1 toward the output region 21F2. In addition, the signal connection wirings 20e straddle a different centerline 20L2 in a plan view of the charge generation chips 20. These centerlines 20L1 and 20L2 overlap the gaps formed between the reading chips 30 adjacent to each other when the charge generation chips 20 are arranged on the reading chips 30. The lengths of the signal connection wirings 20e in a short direction are smaller than arrangement intervals between the charge output electrodes 20g. The lengths of the signal connection wirings 20e in a longitudinal direction are longer than one side of each of the charge output electrodes 20g. For example, the lengths of the signal connection wirings 20e in the longitudinal direction may be the total of the lengths of two charge output electrodes 20g and the length of one gap. The thicknesses of the signal connection wirings 20e may be approximately the same as the thicknesses of the charge output electrodes 20g.

<Reading Chip>

Figure 4:
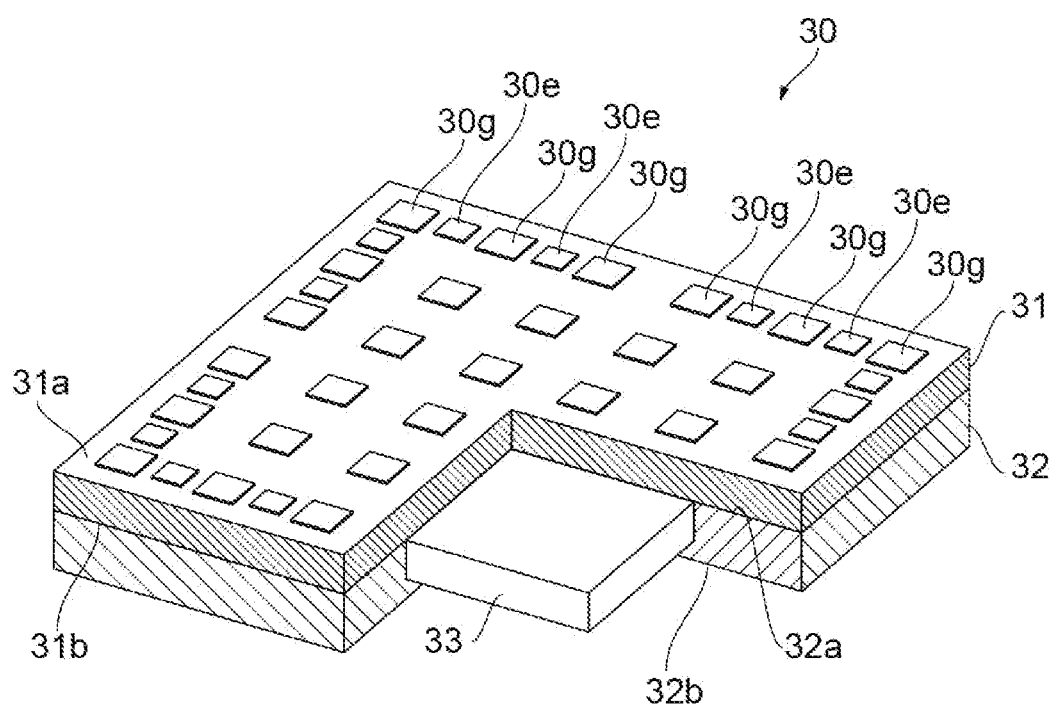
FIG. 4 is a perspective view illustrating the reading chip in FIG. 1.

FIG. 4 is a perspective view of the reading chip 30. When viewed in terms of a single chip, there is no essential difference between the outer reading chip 30S and the inner reading chip 30K.

The reading chip 30 generates a pixel signal based on charges generated by the semiconductor detection portion 21. A pixel signal is a digital value. The reading chip 30 outputs a pixel signal to the circuit board 4 via a different adjacent reading chip 30 (refer to FIG. 5). The reading chip 30 has a reading rewiring layer 31 (reading rewiring portion) and a lead-out substrate 32 (lead-out portion).

The reading rewiring layer 31 receives charges from the semiconductor detection portion 21. The reading rewiring layer 31 delivers received charges to the lead-out substrate 32. The reading rewiring layer 31 has a reading rewiring input surface 31a (a first reading surface, a second reading surface) and a reading rewiring output surface 31b. The reading rewiring input surface 31a faces a charge generator 10. The reading rewiring output surface 31b faces the lead-out substrate 32.

The reading rewiring input surface 31a faces the charge output surface 21b of the semiconductor detection portion 21. On the reading rewiring input surface 31a, a plurality of charge reading electrodes 30g are arranged in a two-dimensional shape with equal intervals therebetween. In the reading chip 30 illustrated in FIG. 4, the plurality of charge reading electrodes 30g are arranged on the entire surface of the reading rewiring input surface 31a. The charge reading electrodes 30g face the charge output electrodes 20g. Therefore, the arrangement intervals between the charge reading electrodes 30g are approximately the same as the arrangement intervals between the charge output electrodes 20g. The charge reading electrodes 30g need only face the charge output electrodes 20g. This facing state also allows that a part of each of the charge reading electrodes 30g faces each of the charge output electrodes 20g. Namely, the entire surfaces of the charge reading electrodes 30g are not necessarily required to face the charge output electrodes 20g. Further, the charge reading electrodes 30g are electrically connected to the charge output electrodes 20g by soldering or the like. The charge reading electrodes 30g and the charge output electrodes 20g need only be electrically connected to each other and may be fixed to each other. However, they are not necessarily required to be fixed to each other.

A plurality of signal input/output electrodes 30e are arranged on the reading rewiring input surface 31a. The signal input/output electrodes 30e are provided between the charge reading electrodes 30g. Specifically, the signal input/output electrodes 30e are provided between the charge reading electrodes 30g arranged at the outermost circumference on the reading rewiring input surface 31a. For example, the charge reading electrodes 30g and the signal input/output electrodes 30e are alternately provided at a side portion of the reading rewiring input surface 31a. The signal input/output electrodes 30e extend from the reading rewiring input surface 31a toward the lead-out substrate 32. First end portions of the signal input/output electrodes 30e are exposed on the reading rewiring input surface 31a. Second end portions of the signal input/output electrodes 30e are arranged inside the lead-out substrate 32 (refer to FIG. 5). Namely, the second end portions of the signal input/output electrodes 30e are not exposed on a rear surface side of the lead-out substrate 32. In other words, the signal input/output electrodes 30e do not penetrate the reading chip 30. Namely, the signal input/output electrodes 30e are not so-called penetration electrodes.

Figure 5:
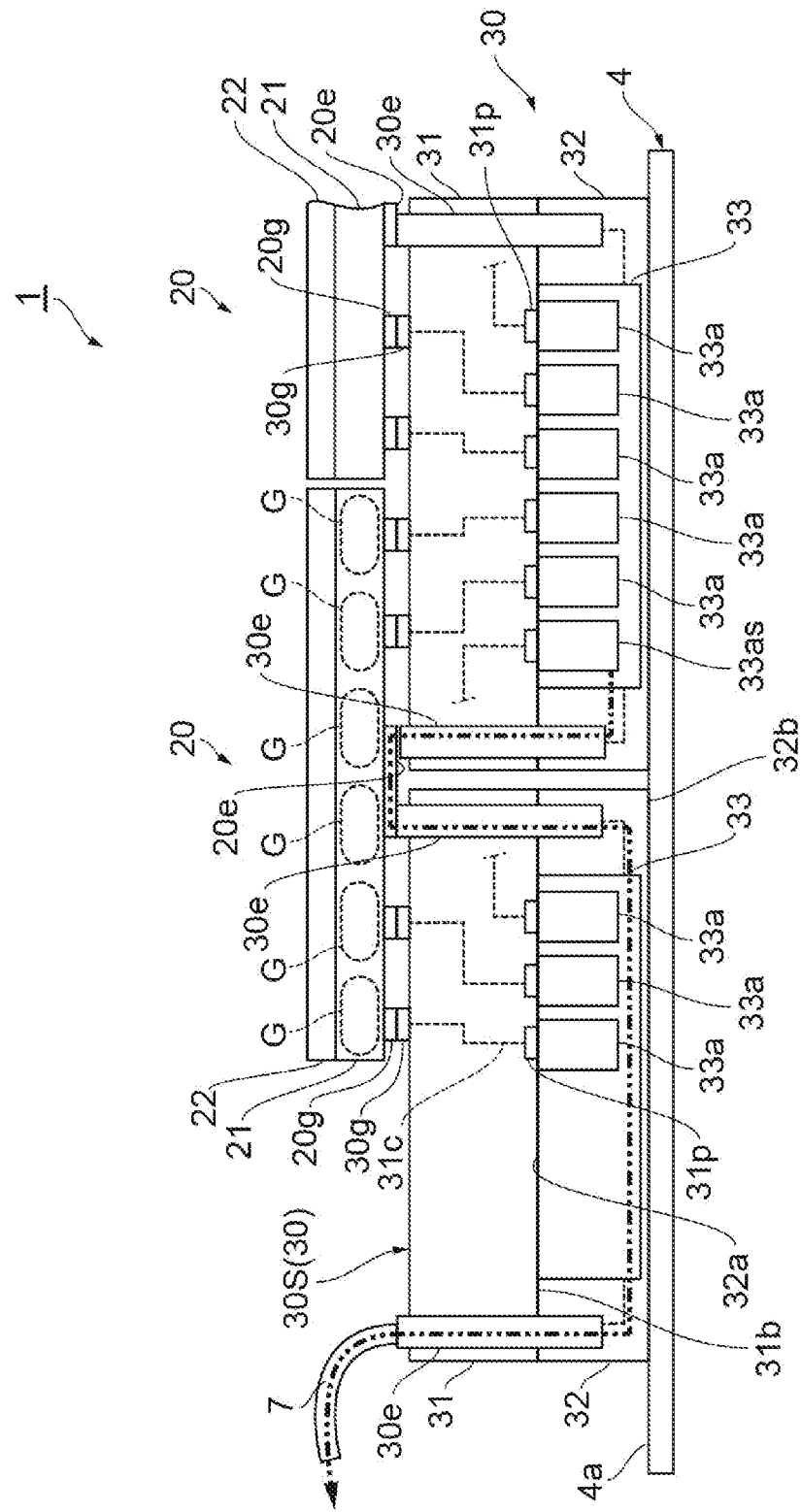
FIG. 5 is a view illustrating a connection constitution of the radiation imaging device in FIG. 1.

As illustrated in FIG. 5, the signal input/output electrodes 30e are connected to signal processors 33 provided in the lead-out substrate 32. The signal input/output electrodes 30e are electrically connected to the signal connection wirings 20e provided in the charge generation chip 20. Therefore, the signal input/output electrodes 30e face the signal connection wirings 20e. The signal input/output electrodes 30e are each connected to an adjacent signal input/output electrode 30e of the reading chip 30 through the signal connection wirings 20e. In addition, some of the signal input/output electrodes 30e of the outer reading chips 30S function as input/output ends of the reader 3. Namely, the bonding wires 7 are connected to some of the signal input/output electrodes 30e of the outer reading chips 30S.

The signal input/output electrodes 30e output a signal from the signal processors 33 to the outside of the reading chip 30. In addition, the signal input/output electrodes 30e deliver a signal received from the outside of the reading chip 30 to the signal processors 33. In this case, the signal processors 33 deliver a signal received from a certain signal input/output electrode 30e to a different signal input/output electrode 30e as it stands. In this case, a signal received from the inner reading chip 30K adjacent thereto on one side is output to the outer reading chip 30S adjacent thereto on the other side.

The reading rewiring output surface 31b comes into contact with a lead-out input surface 32a of the lead-out substrate 32. A plurality of rewiring electrodes 31p are arranged on the reading rewiring output surface 31b in a two-dimensional shape. The reading rewiring layer 31 delivers charges to the lead-out substrate 32 via the rewiring electrodes 31p. The rewiring electrodes 31p are electrical connection points between the reading rewiring layer 31 and the lead-out substrate 32. A specific constitution of the rewiring electrodes 31p is not particularly limited. The number of rewiring electrodes 31p is the same as the number of charge reading electrodes 30g. Namely, one charge reading electrode 30g is connected to one rewiring electrode 31p. The rewiring electrodes 31p are arranged on the reading rewiring output surface 31b in a two-dimensional shape. Arrangement intervals between the rewiring electrodes 31p differ from the arrangement intervals between the charge reading electrodes 30g. Specifically, the arrangement intervals between the rewiring electrodes 31p are narrower than the arrangement intervals between the charge reading electrodes 30g.

The lead-out substrate 32 has the lead-out input surface 32a, a lead-out rear surface 32b, and the signal processors 33.

The rewiring electrodes 31p are arranged on the lead-out input surface 32a. The rewiring electrodes 31p are connected to the signal processors 33. The signal processors 33 convert charges into a pixel signal (digital value). The signal processors 33 convert charges output by the charge generator 10 into an energy integrated signal (pixel signal). An energy integrated signal includes information of an energy of at least incident radiation. The signal processors 33 output an image signal via the signal input/output electrodes 30e. The signal processors 33 receive a control signal from the signal input/output electrodes 30e. In addition, the signal processors 33 deliver an image signal or a control signal received from a certain signal input/output electrode 30e to a different signal input/output electrode 30e as it stands.

The lead-out rear surface 32b faces a circuit board main surface 4a. No electrical or physical constituent part is formed on the lead-out rear surface 32b. For example, the second end portions of the signal input/output electrodes 30e are not exposed on the lead-out rear surface 32b. The lead-out rear surface 32b is merely physically fixed to the circuit board main surface 4a. Therefore, on the circuit board main surface 4a, no electrical or physical constituent part is formed in a region facing the lead-out rear surface 32b.

Namely, the flat lead-out rear surface 32b of the reading chip 30 is attached to the flat circuit board main surface 4a of the circuit board 4.

The signal processors 33 has a plurality of signal processing portions 33a. One signal processing portion 33a corresponds to one pixel G. Therefore, one rewiring electrode 31p is connected to one signal processing portion 33a.

Here, it should be noted that arrangement intervals between the signal processing portions 33a and arrangement intervals between the pixels G differ from each other. Specifically, the arrangement intervals between the signal processing portions 33a are narrower than the arrangement intervals between the pixels G. This is because the pixels G are arranged throughout the entire surface of the charge generation chip 20, whereas the signal processing portions 33a are arranged in a region surrounded by the signal input/output electrodes 30e. The region surrounded by the signal input/output electrodes 30e is smaller than the region of the entire surface of the charge generation chip 20. Further, one pixel G corresponds to one signal processing portion 33a. Namely, the number of pixels G and the number of signal processing portions 33a are equivalent to each other. Therefore, there is a need to cause the arrangement intervals between the signal processing portions 33a to be narrower than the arrangement intervals between the pixels G. Hence, the reading chip 30 includes the reading rewiring layer 31 for converting the arrangement intervals between the signal processing portions 33a into the arrangement intervals between the pixels G. Namely, the reading rewiring layer 31 is a pitch conversion substrate.

The relationship between the arrangement intervals between the signal processing portions 33a and the arrangement intervals between the pixels G is not limited to the foregoing relationship. A constitution in which the arrangement intervals between the signal processing portions 33a and the arrangement intervals between the pixels G are caused to coincide with each other can also be realized. In such a case, the reading rewiring layer 31 can also be omitted. Moreover, a constitution exhibiting the function of converting arrangement intervals need only be present between the pixels G and the signal processing portions 33a. Namely, a constitution exhibiting the function of converting arrangement intervals may be provided in the charge generation chip 20. Moreover, a constitution exhibiting the function of converting arrangement intervals may be provided on both the charge generation chip 20 and the reading chip 30. These examples will be described later as a second embodiment, a third embodiment, and a fourth embodiment.

Figure 6:
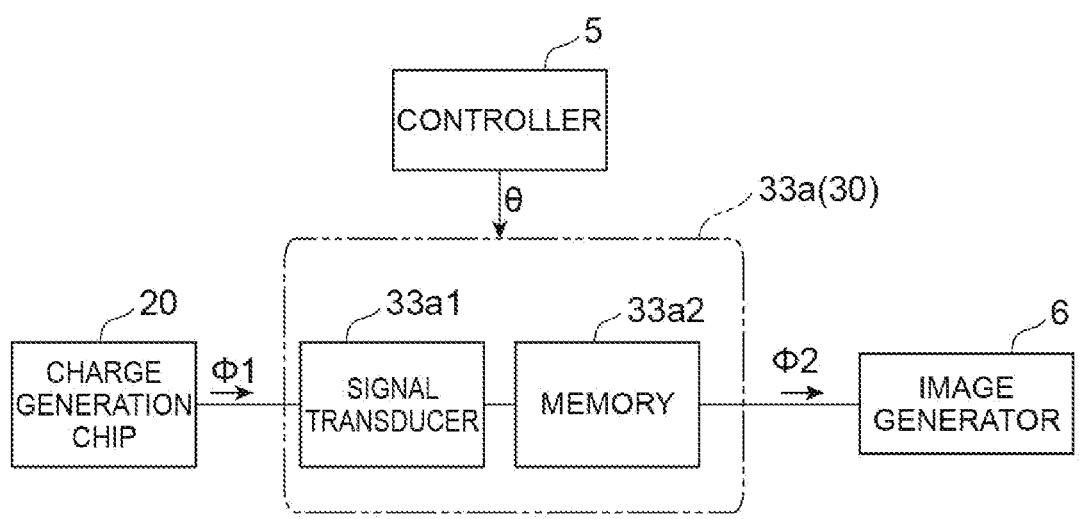
FIG. 6 is a functional block diagram of the radiation imaging device in FIG. 1.

As illustrated in FIG. 6, the reading chip 30 has a signal transducer 33a1 and a memory 33a2. The signal transducer 33a1 and the memory 33a2 constitute the signal processing portion 33a. Namely, one signal transducer 33a1 and one memory 33a2 are connected to one pixel of the charge generation chip 20.

One signal transducer 33a1 is connected to one charge output electrode 20g of the charge generation chip 20 via a wiring 31c of the reading rewiring layer 31 (refer to FIG. 5). The signal transducer 33a1 receives charges $\phi 1$ from the charge generation chip 20. The signal transducer 33a1 performs discretization of an analog signal based on the charges $\phi 1$. An analog signal is expressed as a voltage. A voltage corresponds to the energy or the number of particles of radiation incident on the corresponding pixel G of the charge generation chip 20. Therefore, the signal transducer 33a1 is an A/D converter outputting a digital signal. For example, the resolution of the signal transducer 33a1 may be set to 10 bits.

The memory 33a2 is connected to the signal transducer 33a1. The memory 33a2 receives a digital signal $\phi 2$ from the signal transducer 33a1. Further, the memory 33a2 retains the digital signal $\phi 2$ every time the digital signal $\phi 2$ is input. The memory 33a2 successively retains the digital signal $\phi 2$ in a predetermined memory space. Further, the memory 33a2 outputs the digital signal $\phi 2$ to the image generator 6 in accordance with a control signal $\theta$ provided from the controller 5.

<Operational Effects>

Hereinafter, the background leading to development of the radiation imaging device 1 will be described, and operational effects of the radiation imaging device 1 will be described.

The inventors of this application have been conducting research and development on processes of manufacturing the radiation imaging device 1. Examples of processes of manufacturing the radiation imaging device 1 include a step of forming an electrode in a semiconductor detector, a step of cutting out chips from a wafer, and a step of bonding chips to each other.

A scintillation detector and a semiconductor detection portion are examples of a radiation detector. When a scintillation detector and a semiconductor detection portion are compared to each other, a semiconductor detector can easily realize high sensitivity and high resolution in an X-ray imaging technology. The radiation imaging device 1 including a semiconductor detector can capture a finer X-ray image within a shorter period of time. As a result, the radiation imaging device 1 including a semiconductor detector is utilized for medical, industrial, and non-destructive inspection, security, industrial/infrastructure inspection, and the like.

However, it is difficult to realize a large detection area with a single element in a semiconductor detector. A detection area in a single semiconductor detector is approximately 20 mm×20 mm, as an example. In the field in which the radiation imaging device 1 described above is utilized, for example, a detection area of 400 mm×400 mm is required. Hence, a technique for realizing a large detection area which cannot be realized with a single semiconductor detector using a plurality of semiconductor detection portions has been studied.

A signal output by a semiconductor detector due to incident radiation cannot be read by only the semiconductor detector. Namely, in addition to a semiconductor detector, the radiation imaging device 1 includes a reading circuit for processing a signal output by the semiconductor detector. The semiconductor detector and the reading circuit are layered. In this manner, an element including a semiconductor detector and a reading circuit will be referred to as a detector module. Further, a signal output for each pixel of the semiconductor detector is converted into a digital value through signal processing in the reading circuit. The digital value is converted into a radiation image through additional signal processing. Therefore, there is a need to transfer a digital value from the reading circuit to a processing device performing processing of generating a radiation image. Namely, there is a need to electrically connect the processing device and the reading circuit to each other.

Regarding such a connection constitution, there is a constitution in which a circuit board and reading circuits are connected to each other using bonding wires for each of a plurality of reading circuits arranged on the circuit board. However, in such a constitution, there is a need to arrange bonding pads around the reading circuits. Namely, a large gap to the extent that the bonding pads can be arranged is generated between reading circuits adjacent to each other. Semiconductor detectors are provided on the reading circuits. Therefore, the gap between the reading circuits can also be referred to as a gap between the semiconductor detectors. The gap between the semiconductor detectors does not function as a radiation detection region. As a result, it is disadvantageous for an image capturing device.

Regarding another technology of connecting reading chips to a circuit board, there is a technology of using a penetration electrode exposed on rear surfaces of reading chips. Such a technology is also referred to as a through silicon via (TSV). Since a through silicon via is exposed on the rear surfaces of the reading chips, connection locations between the reading chips and the circuit board are parts where the reading chips and the circuit board face each other. In such a case, since there is no need to provide bonding pads around the reading chips, the gap between the reading circuits can be reduced.

However, in order to provide a through silicon via, there is a need to cause the reading chips for providing a through silicon via to be thinned to a predetermined thickness. As a result, the mechanical strength of the reading chips is reduced. If the mechanical strength of the reading chips is reduced, the degree of difficulty in step of bonding charge generation chips and reading chips to each other increases. Specifically, it is difficult to hold the charge generation chips and the reading chips. In addition, the degree of difficulty in step of arranging reading chips on a circuit board also increases.

From the technical background described above, the inventors of this application have invented the radiation imaging device 1. Namely, the charge generation chips 20 and the reading chips 30 are not layered in a one-to-one manner, but the charge generation chips 20 and the reading chips 30 are layered such that their positions are misaligned in a horizontal direction. Further, between the reading chips 30, the electrodes provided on front surfaces of the reading chips 30 are connected to each other through the signal connection wirings 20e provided in the charge generation chips 20.

In short, the reading chips 30 of the radiation imaging device 1 each have the signal input/output electrodes 30e provided on the reading rewiring input surface 31a facing the charge generation chip 20. For example, the signal input/output electrodes 30e of the outer reading chips 30S are connected to the signal input/output electrodes 30e of the inner reading chips 30K through the signal connection wirings 20e provided in the charge generation chip 20. Therefore, the outer reading chips 30S can be connected to the inner reading chips 30K by simply arranging the charge generation chips 20 in a manner of straddling the reading chips 30 adjacent to each other. As a result, since the outer reading chips 30S can be easily connected to the inner reading chips 30K, occurrence of defective work during assembling of the radiation imaging device 1 is curbed. Therefore, decrease in yield can be curbed.

According to such a connection constitution, there is no need to provide bonding pads around the reading chips 30 for each of the reading chips 30. Moreover, there is also no need to provide charge generation chips and reading chips in the reading chips 30.

As a result, the radiation imaging device 1 can achieve the following effects. Since there is no need to provide bonding pads around the reading chips 30, the intervals between the reading chips 30 can be reduced. Since the reading chips 30 and the charge generation chips 20 are arranged in a misaligned manner, the charge generation chips 20 are present above the gaps between the reading chips 30. Therefore, the charge generation chips 20 are unlikely to receive an influence of the gaps between the reading chips 30. Since there is no need to provide a through silicon via in the reading chips 30, there is no need for the reading chips 30 to be thinned. As a result, since deterioration in mechanical strength due to thinning is curbed, the reading chips 30 are easily handled. Moreover, since the reading chips 30 have sufficient thicknesses, they can also withstand thermal stress generated in the reading chips 30 due to heat generated during operation.

Moreover, no through silicon via is exposed on the rear surfaces of the reading chips 30. Therefore, a step of connecting a through silicon via and the electrode of the circuit board 4 is not necessary. Furthermore, since no through silicon via is exposed on the rear surfaces of the reading chips 30, the rear surfaces of the reading chips 30 are flat. Therefore, a dimensional error in attachment of the reading chips 30 to the circuit board 4 can be reduced. Specifically, the reading chips 30 can be easily attached to a front surface of the circuit board 4 in a parallel manner. In addition, positions in a height direction based on the front surface of the circuit board 4 can be easily aligned for each of the reading chips 30.

Handling of thin-film chips, electrical bonding of through silicon vias, assembly satisfying required attachment accuracy, and the like can all cause defective work. The radiation imaging device 1 can eliminate these problems in the step of manufacturing the radiation imaging device 1. As a result, occurrence of a defective product caused during manufacturing of the radiation imaging device 1 can be curbed. Therefore, the yield in manufacturing of the radiation imaging device 1 can be improved.

Second Embodiment

Figure 7:
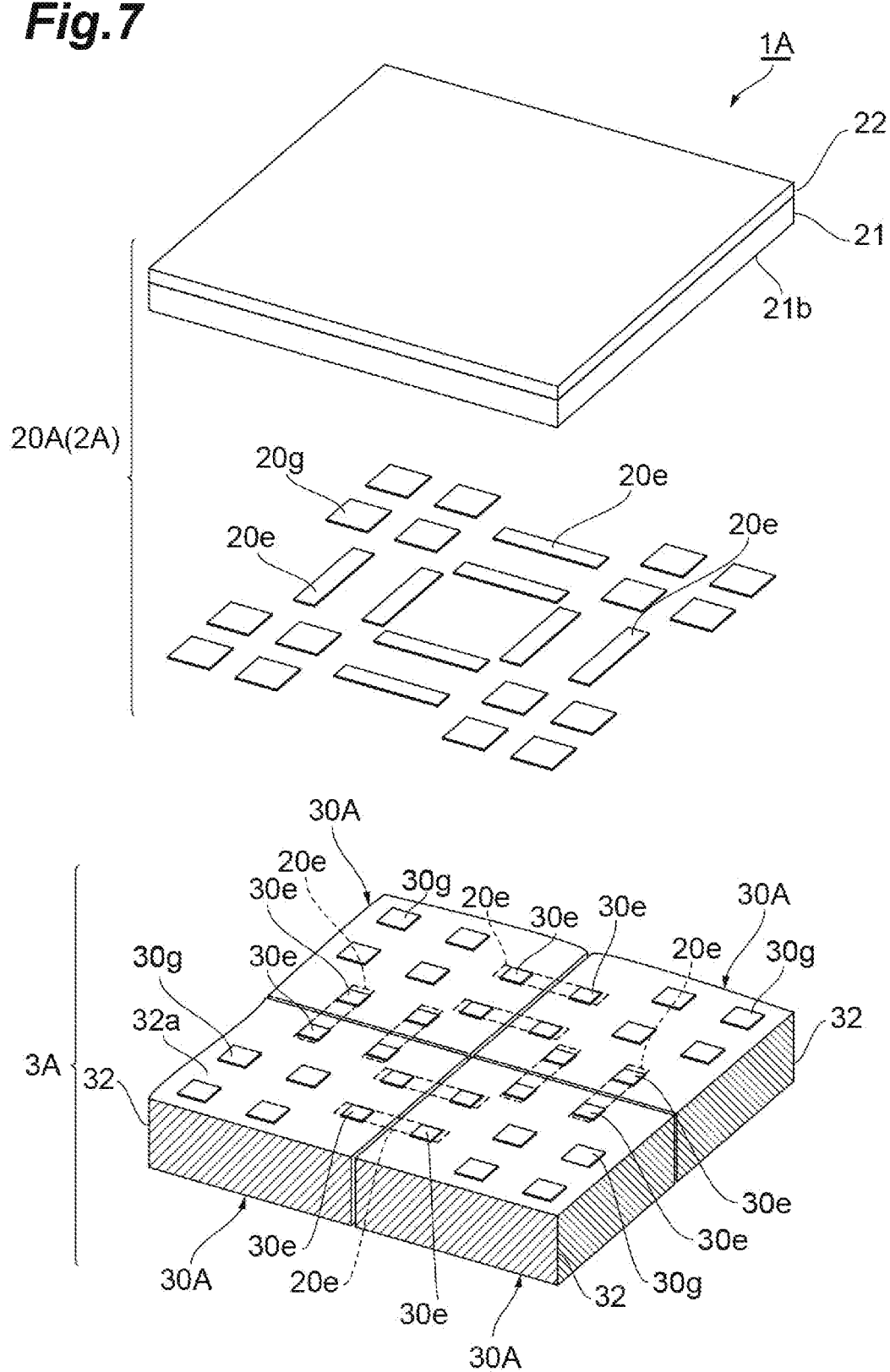
FIG. 7 is an exploded perspective view illustrating a charge generation chip and a reading chip provided in a radiation imaging device according to a second embodiment.
Figure 8:
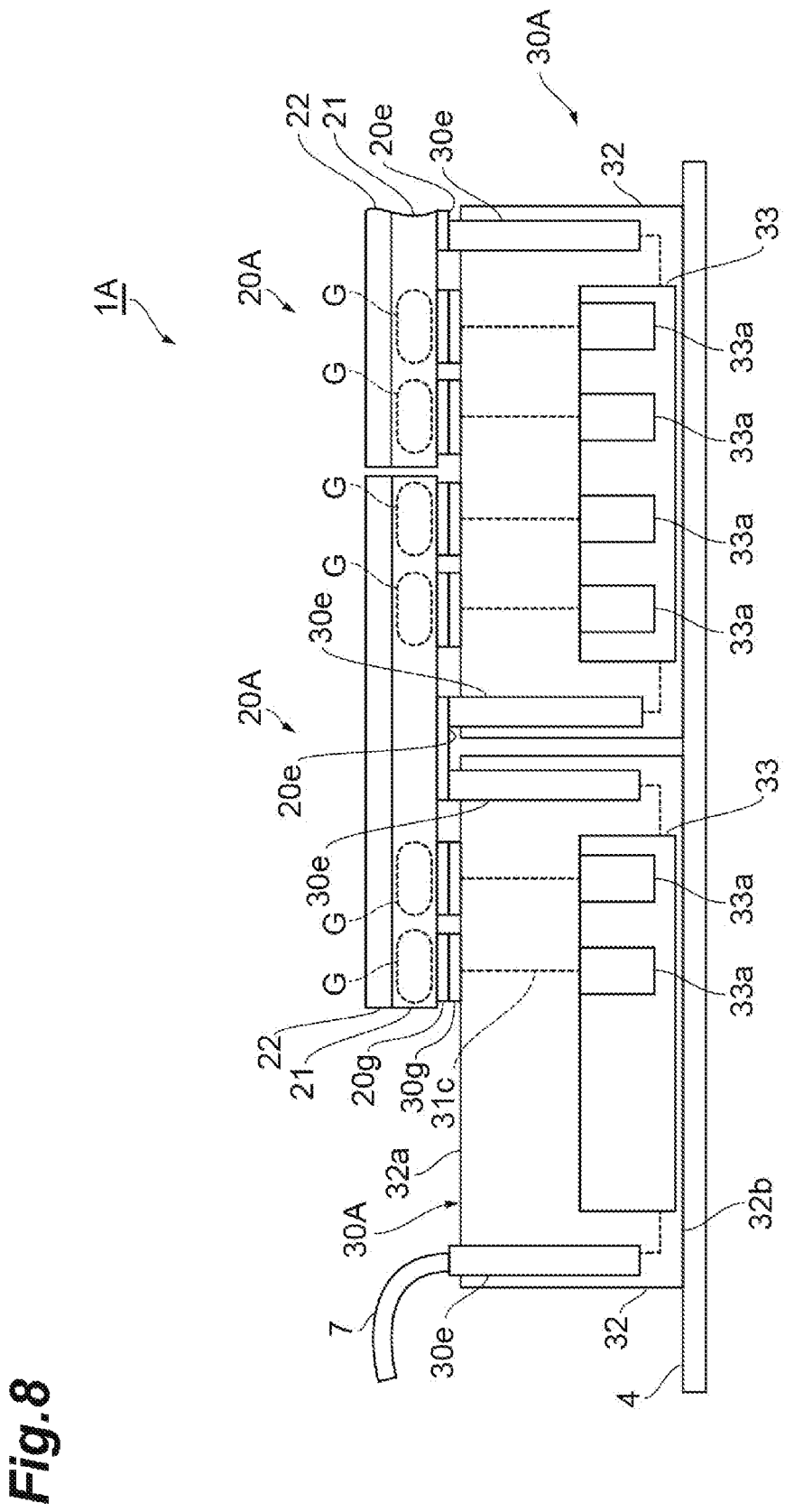
FIG. 8 is a view illustrating a connection constitution of the radiation imaging device in FIG. 7.

FIG. 7 is an exploded perspective view illustrating a charge generation chip 20A and a reading chip 30A provided in a radiation imaging device 1A according to the second embodiment. FIG. 8 is a view illustrating a connection constitution of the radiation imaging device 1A in FIG. 7. As described above, it has been described that when the arrangement intervals between the pixels G and the arrangement intervals between the signal processing portions 33a differ from each other, the reading rewiring layer 31 is required as a constitution for matching the arrangement intervals. In the second embodiment, the radiation imaging device 1A in which the arrangement intervals between the pixels G and the arrangement intervals between the signal processing portions 33a are the same as each other will be described. Namely, the radiation imaging device 1A according to the second embodiment does not have a constitution for changing arrangement intervals.

The radiation imaging device 1A has a charge generator 2A and a reader 3A. The charge generator 2A has a plurality of charge generation chips 20A. In the radiation imaging device 1 according to the first embodiment, arrangement of the charge output electrodes 20g is not limited by the arrangement of the signal processing portions 33a. In contrast, the arrangement of the signal processing portions 33a is not limited by the arrangement of the charge output electrodes 20g. On the other hand, in the radiation imaging device 1A according to the second embodiment, the constitutions of the charge output electrodes 20g are limited by the constitutions of the signal processing portions 33a. Namely, the charge output electrodes 20g are arranged such that they correspond to the arrangement of the plurality of signal processing portions 33a constituting the signal processors 33. In the charge generation chips 20A, the constitutions of the charge output electrodes 20g differ from the constitutions of the charge output electrodes 20g of the charge generation chips 20 according to the first embodiment. Specifically, on the charge output surface 21b, the charge output electrodes 20g are provided in only the regions overlapping the signal processing portions 33a. Namely, the charge output electrodes 20g are not provided in regions not overlapping the signal processing portions 33a. Regions not overlapping the signal processing portions 33a are regions provided with the signal connection wirings 20e. Therefore, in the charge generation chips 20A according to the second embodiment, as in the charge generation chips 20 according to the first embodiment, the charge output electrodes 20g are not provided between the signal connection wirings 20e.

When this condition is satisfied, the charge output electrodes 20g and the signal processing portions 33a which are electrically bonded to each other can be caused to overlap each other in a thickness direction of the charge generation chips 20A and a thickness direction of the reading chips 30A. Namely, since the arrangement intervals between the charge output electrodes 20g correspond to the arrangement intervals between the signal processing portions 33a, a constitution for causing the arrangement intervals thereof to match each other is not necessary. As a result, as illustrated in FIG. 7, the reading chips 30A according to the second embodiment each do not include the reading rewiring layer 31. The reading chips 30A according to the second embodiment each have only the lead-out substrate 32. Further, the charge reading electrodes 30g and the signal input/output electrodes 30e are provided on the lead-out input surface 32a of the lead-out substrate 32.

In the radiation imaging device 1A according to the second embodiment, the constitutions of the reading chips 30A can be made simple.

Third Embodiment

Figure 9:
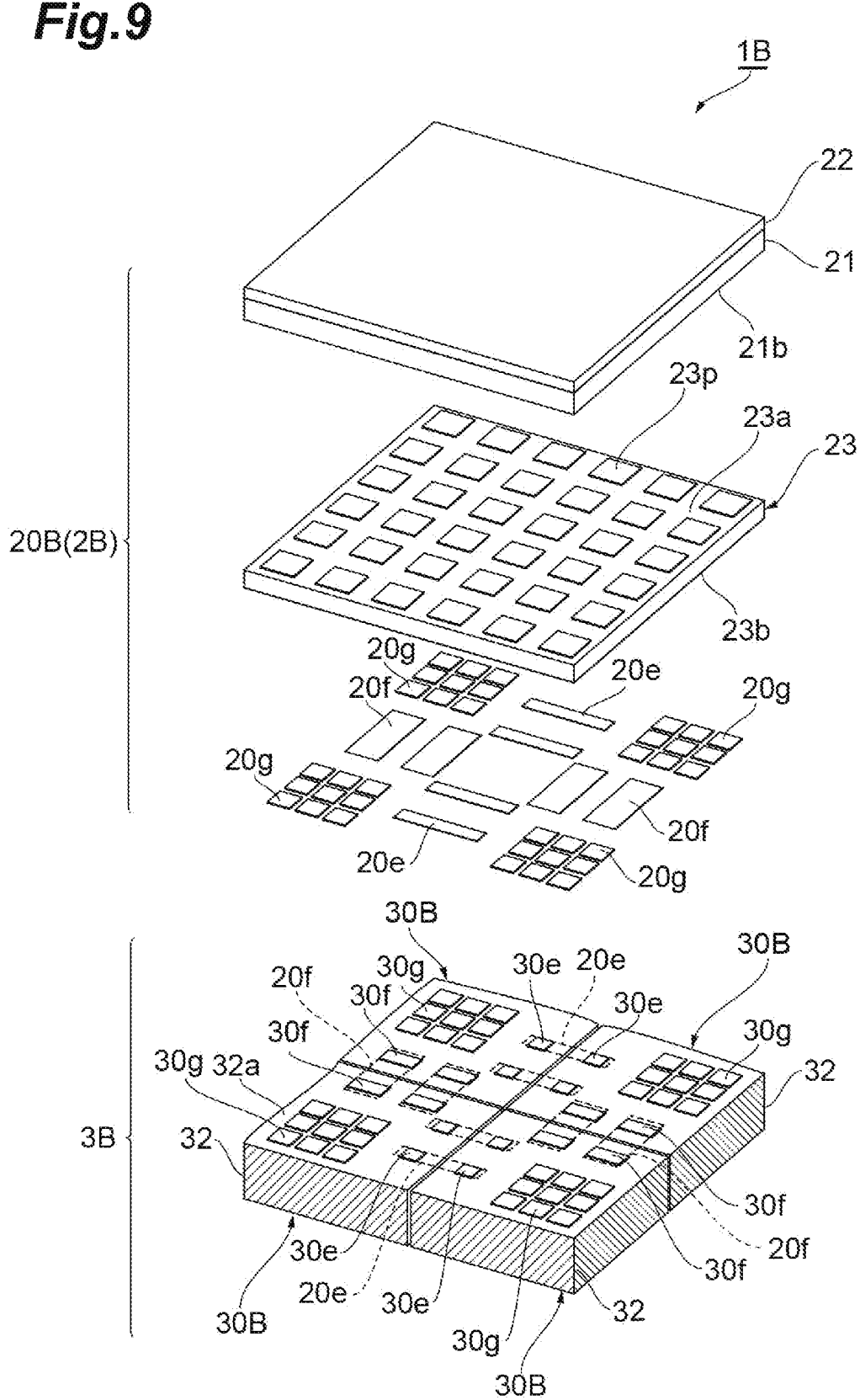
FIG. 9 is an exploded perspective view illustrating a charge generation chip and a reading chip provided in a radiation imaging device according to a third embodiment.
Figure 10:
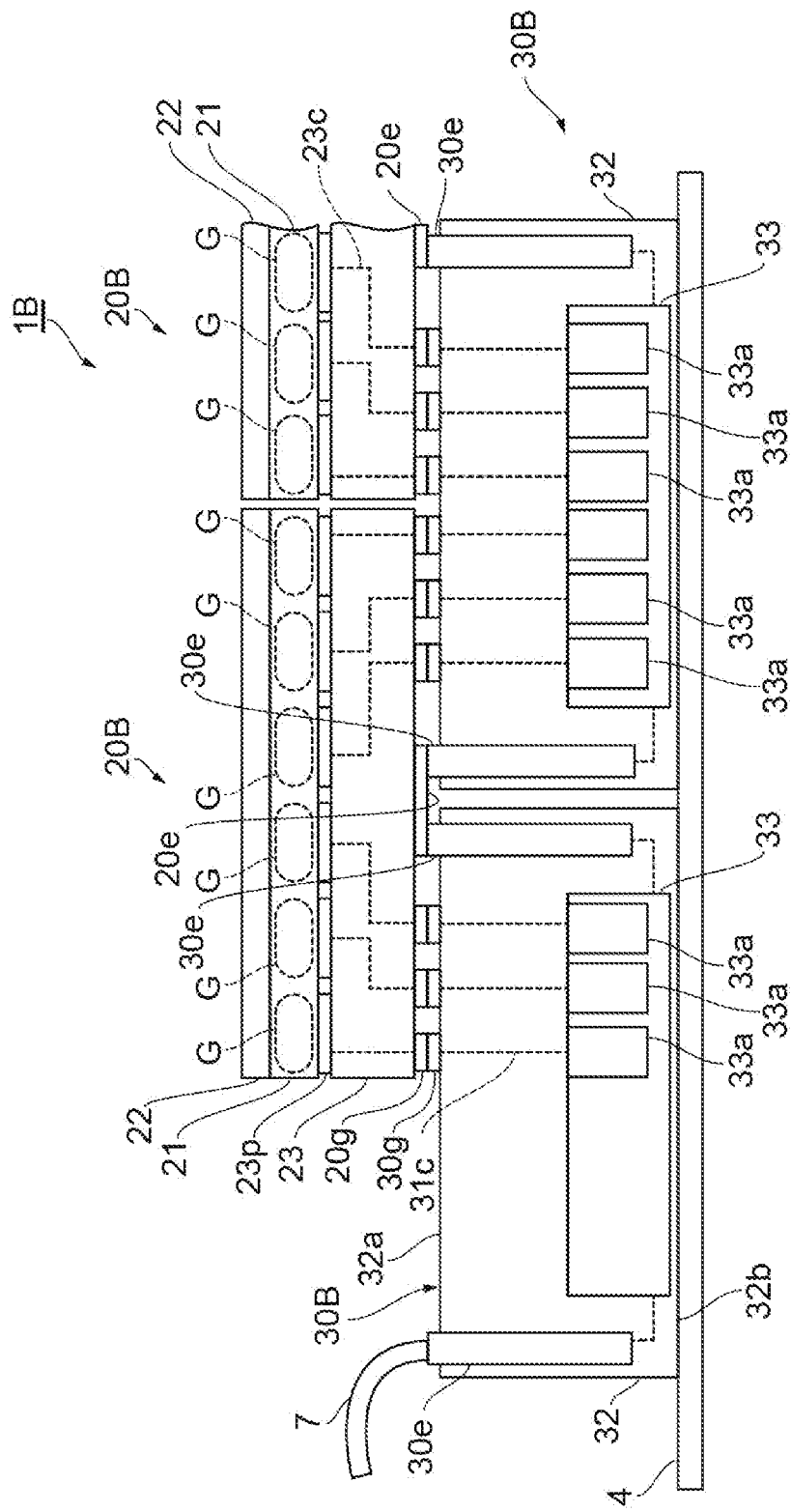
FIG. 10 is a view illustrating a connection constitution of the radiation imaging device in FIG. 9.

FIG. 9 is an exploded perspective view illustrating a charge generation chip 20B and a reading chip 30B provided in a radiation imaging device 1B according to the third embodiment. FIG. 10 is a view illustrating a connection constitution of the radiation imaging device 1B in FIG. 9. Similar to the radiation imaging device 1 according to the first embodiment, the radiation imaging device 1B according to the third embodiment employs a constitution in which the arrangement of the charge output electrodes 20g is not limited by the arrangement of the signal processing portions 33a. In the first embodiment, a constitution for causing the arrangement intervals to match each other is provided in the reading chip 30. A constitution for causing the arrangement intervals to match each other may be provided between the semiconductor detection portion 21 and the signal processing portions 33a. Hence, in the radiation imaging device 1B according to the third embodiment, a constitution for causing the arrangement intervals to match each other is provided in the charge generation chip 20B.

As illustrated in FIG. 9, the radiation imaging device 1B has a charge generator 2B and a reader 3B. Further, the charge generator 2B has a plurality of charge generation chips 20B. The reader 3B has a plurality of reading chips 30B.

The charge generation chips 20B has the semiconductor detection portion 21, the control electrode portion 22, and a charge rewiring layer 23 (charge rewiring portion). The charge rewiring layer 23 causes the arrangement intervals between the pixels G to match the arrangement intervals between the signal processing portions 33a. The charge rewiring layer 23 is provided on the charge output surface 21b of the semiconductor detection portion 21. The charge rewiring layer 23 has a charge rewiring input surface 23a facing the charge output surface 21b and a charge rewiring output surface 23b facing the reading chip 30B. In the third embodiment, the charge rewiring output surface 23b corresponds to the charge output surface stated in the claims A plurality of pixel electrodes 23p are provided on the charge rewiring input surface 23a. The pixel electrodes 23p are arranged such that they are separated from each other in a two-dimensional shape. In the third embodiment, arrangement of the pixel electrodes 23p corresponds to arrangement of the pixels G. Namely, the arrangement of the pixel electrodes 23p determines the effective pixel regions. The charge output electrodes 20g and the signal connection wirings 20e and 20f are provided on the charge rewiring output surface 23b. Here, the charge rewiring layer 23 includes a wiring 23c electrically connecting one pixel electrodes 23p and one charge output electrode 20g to each other (refer to FIG. 10). Using this wiring 23c, the arrangement intervals between the charge output electrodes 20g can differ from the arrangement intervals between the pixel electrodes 23p.

Hence, the charge output electrodes 20g are provided in regions not provided with the signal connection wirings 20e and 20E In this case, the arrangement of the charge output electrodes 20g may correspond to the arrangement of the signal processing portions 33a of the reading chips 30B. Namely, there is no need to provide a constitution for causing the arrangement intervals to match each other between the charge output electrodes 20g and the signal processing portions 33a. Moreover, on the charge rewiring output surface 23b, the regions provided with the charge output electrodes 20g and the regions provided with the signal connection wirings 20e and 20f do not overlap each other. As a result, the constitutions of the signal connection wirings 20e and 20f can be determined without being limited to the constitutions of the charge output electrodes 20g. For example, in the first embodiment, the signal connection wirings 20e are provided between the charge output electrodes 20g. Therefore, the widths of the signal connection wirings 20e are limited to the intervals between the charge output electrodes 20g. Namely, the widths of the signal connection wirings 20e cannot exceed the intervals between the charge output electrodes 20g. In addition, the signal connection wirings 20e cannot be provided at places where the charge output electrodes 20g are provided.

In contrast, in the radiation imaging device 1B according to the third embodiment, the charge output electrodes 20g are not provided in the regions provided with the signal connection wirings 20e and 20E Therefore, arrangement of the signal connection wirings 20e and 20f is not limited to the arrangement of the charge output electrodes 20g. For example, the signal connection wirings 20e having first widths and the signal connection wirings 20f having second widths larger than the first widths can be provided. In addition, the signal connection wirings 20e and 20f can be arranged at arbitrary places in the regions in which the signal connection wirings 20e and 20f can be installed.

The reading chips 30B each has the lead-out substrate 32. Namely, the reading chips 30B each do not include the reading rewiring layer 31. The lead-out input surface 32a (the first reading surface, the second reading surface) of the lead-out substrate 32 faces the charge generation chip 20B. The charge reading electrodes 30g and the signal input/ output electrodes 30e and 30f are provided on the lead-out input surface 32a. The charge reading electrodes 30g face the charge output electrodes 20g. The charge reading electrodes 30g are electrically connected to the charge output electrodes 20g. Arrangement of the charge reading electrodes 30g may correspond to the arrangement of the signal processing portions 33a. The signal input/output electrodes 30e face the signal connection wirings 20e. The signal input/output electrodes 30e are electrically connected to the signal connection wirings 20e. Signal input/output electrodes 30f face the signal connection wirings 20E The signal input/output electrodes 30f are electrically connected to the signal connection wirings 20E In the radiation imaging device 1B according to the third embodiment, the effective pixel regions can be sufficiently secured, and the degree of freedom of the shapes and the arrangement of the signal connection wirings 20e and 20f can be enhanced.

Fourth Embodiment

Figure 11:
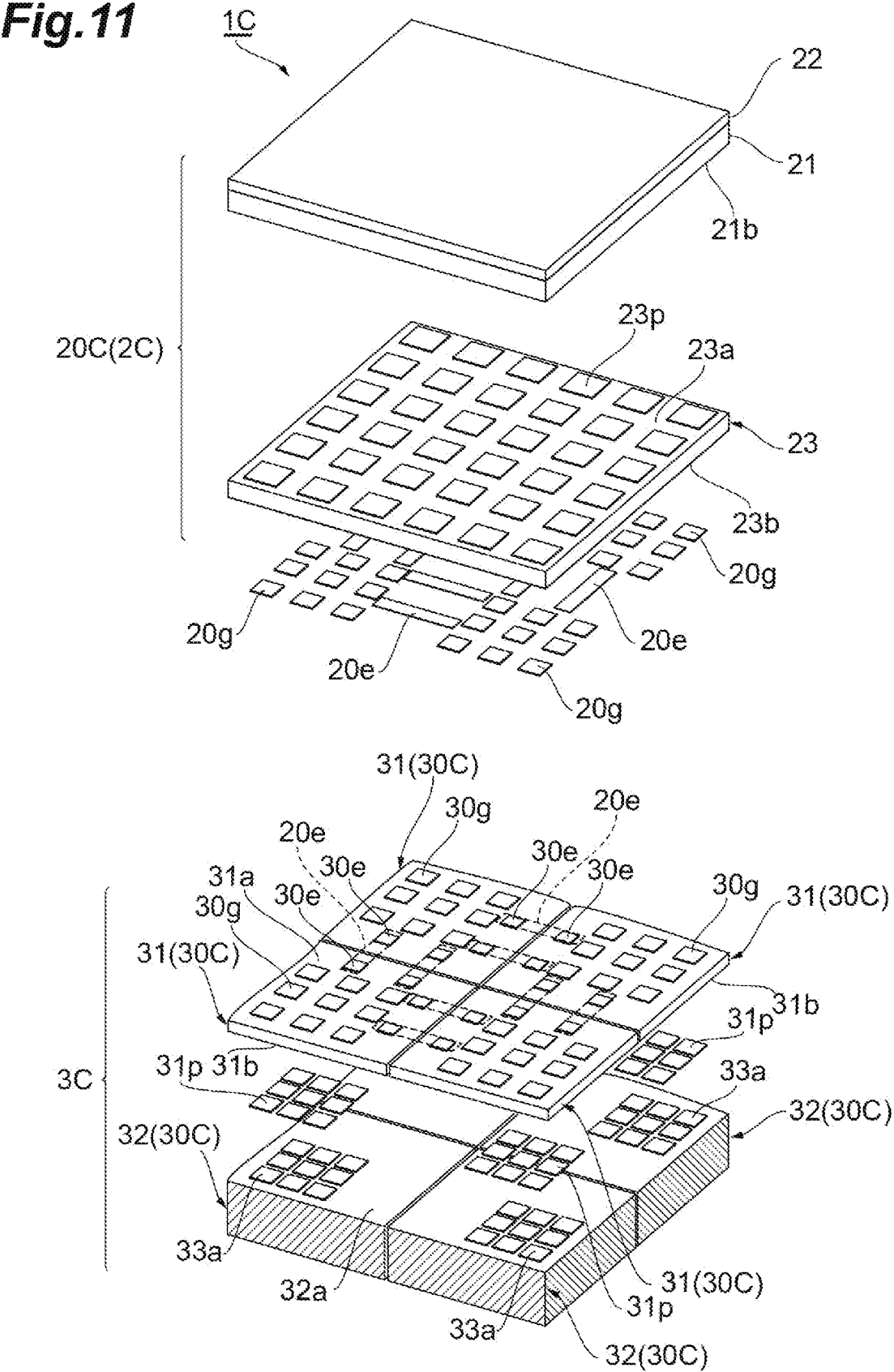
FIG. 11 is an exploded perspective view illustrating a charge generation chip and a reading chip provided in a radiation imaging device according to a fourth embodiment.
Figure 12:
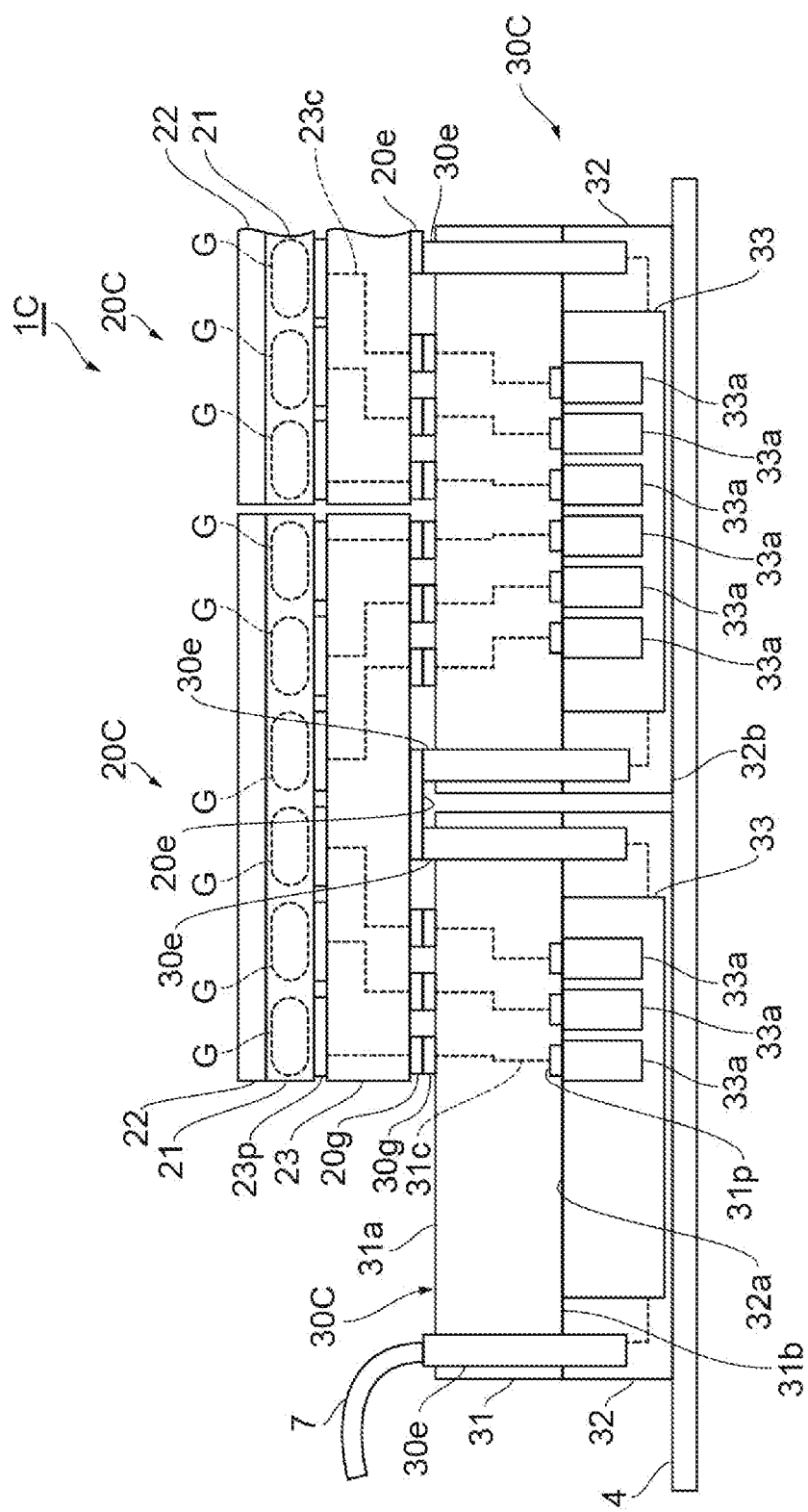
FIG. 12 is a view illustrating a connection constitution of the radiation imaging device in FIG. 11.

FIG. 11 is an exploded perspective view illustrating a charge generation chip 20C and a reading chip 30C provided in a radiation imaging device 1C according to the fourth embodiment. FIG. 12 is a view illustrating a connection constitution of the radiation imaging device 1C in FIG. 11. Similar to the first embodiment and the third embodiment, the radiation imaging device 1C according to the fourth embodiment also employs a constitution in which the arrangement of the pixels G is not limited by the arrangement of the signal processing portions 33a. Hence, in the radiation imaging device 1C according to the fourth embodiment, a constitution for causing the arrangement intervals to match each other is provided in the charge generation chip 20C, and a constitution for causing the arrangement intervals to match each other is also provided in the reading chip 30C.

As illustrated in FIG. 11, the radiation imaging device 1C according to the fourth embodiment has a charge generator 2C and a reader 3C. Further, the charge generator 2C has a plurality of charge generation chips 20C. The reader 3C has a plurality of reading chips 30C.

The charge generation chips 20C has the semiconductor detection portion 21, the control electrode portion 22, and the charge rewiring layer 23. The pixel electrodes 23p are provided on the charge rewiring input surface 23a of the charge rewiring layer 23. Arrangement of the pixel electrodes 23p may be determined on the basis of the effective pixel regions. The charge output electrodes 20g and the signal connection wirings 20e are provided on the charge rewiring output surface 23b. The arrangement of the charge output electrodes 20g and the arrangement of the signal connection wirings 20e are not particularly limited. For example, as illustrated in FIG. 11, the regions provided with the charge output electrodes 20g and the regions provided with the signal connection wirings 20e may not overlap each other. In addition, for example, as in the first embodiment, the regions provided with the charge output electrodes 20g and the regions provided with the signal connection wirings 20e may partially overlap each other. The arrangement of the charge output electrodes 20g does not correspond to the arrangement of the signal processing portions 33a.

The reading chips 30C has the reading rewiring layer 31 and the lead-out substrate 32. The charge reading electrodes 30g are provided on the reading rewiring input surface 31a (first reading surface) of the reading rewiring layer 31. The arrangement of the charge reading electrodes 30g corresponds to the arrangement of the charge output electrodes 20g. Namely, the charge reading electrodes 30g are electrically connected to the charge output electrodes 20g. The rewiring electrodes 31p are provided on the reading rewiring output surface 31b of the reading rewiring layer 31. The arrangement of the rewiring electrodes 31p corresponds to the arrangement of the signal processing portions 33a.

In each of the radiation imaging device 1 according to the first embodiment and the radiation imaging device 1B according to the third embodiment, the arrangement of the pixels G and the arrangement of the signal processing portions 33a are caused to match each other by one rewiring layer. In the radiation imaging device 1C according to the fourth embodiment, the arrangement of the pixels G and the arrangement of the signal processing portions 33a are caused to match each other by two rewiring layers. According to this constitution, a matching length per rewiring layer can be shortened.

The radiation imaging device 1 according to the present invention is not limited to the foregoing embodiments.

First Modification Example

Figure 13:
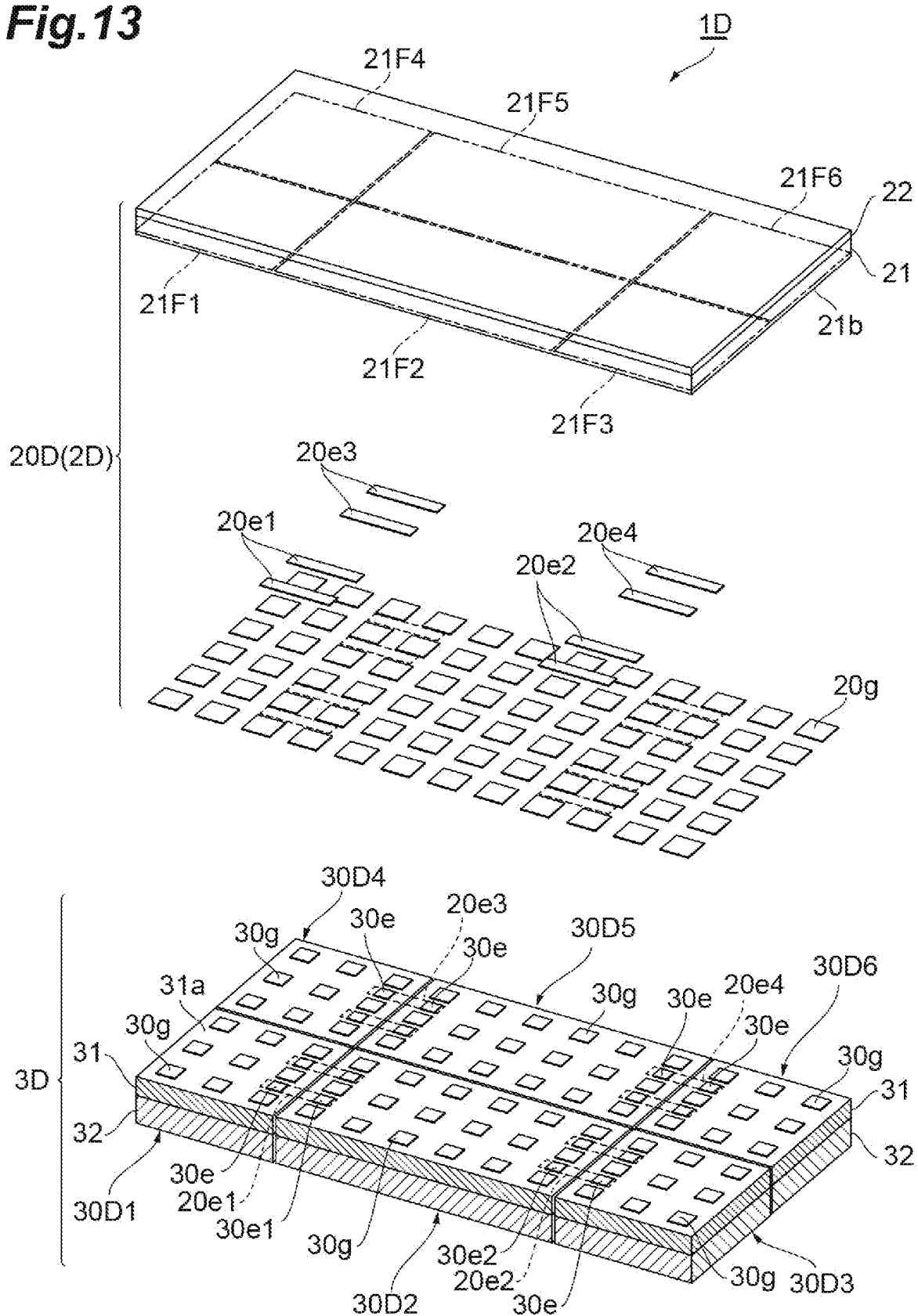
FIG. 13 is an exploded perspective view illustrating a charge generation chip and a reading chip provided in a radiation imaging device according to a first modification example.

FIG. 13 is an exploded perspective view illustrating a charge generation chip 20D and reading chips 30D1 to 30D6 provided in a radiation imaging device 1D according to a first modification example. In the radiation imaging device 1 according to the first embodiment, one charge generation chip 20 straddles the four reading chips 30. Therefore, one charge generation chip 20 electrically connects the reading chips 30 adjacent to each other. For example, as in the radiation imaging device 1D according to the first modification example illustrated in FIG. 13, the charge generation chips 20D may straddle four or more reading chips 30D1 to 30D6. The charge generation chips 20D illustrated in FIG. 13 straddle the first reading chip 30D1, the second reading chip 30D2, the third reading chip 30D3, the fourth reading chip 30D4, the fifth reading chip 30D5, and the sixth reading chip 30D6. Therefore, the charge generation chips 20D has a first output region 21F1, a second output region 21F2, a third output region 21F3, a fourth output region 21F4, a fifth output region 21F5, and a sixth output region 21F6. The first output region 21F1, the second output region 21F2, the third output region 21F3, the fourth output region 21F4, the fifth output region 21F5, and the sixth output region 21F6 respectively face the first reading chip 30D1, the second reading chip 30D2, the third reading chip 30D3, the fourth reading chip 30D4, the fifth reading chip 30D5, and the sixth reading chip 30D6.

The charge generation chip 20D connects three chips such as the first reading chip 30D1, the second reading chip 30D2, and the third reading chip 30D3 (third reading chip) arrayed in the lateral direction on this paper to each other. The third reading chip 30D3 has the reading rewiring input surface 31a (third reading surface) and the signal input/output electrodes 30e (third signal input/output electrodes). Moreover, the charge generation chip 20D also connects three chips such as the fourth reading chip 30D4, the fifth reading chip 30D5, and the sixth reading chip 30D6 arrayed in the lateral direction on this paper to each other. The charge generation chips 20D has a first signal connection wiring 20e1, a second signal connection wiring 20e2, a third signal connection wiring 20e3, and a fourth signal connection wiring 20e4. The first signal connection wiring 20e1 connects the signal input/output electrodes 30e of the first reading chip 30D1 to a signal input/output electrodes 30e1 of the second reading chip 30D2. The second signal connection wiring 20e2 (additional signal connection wiring) connects a different signal input/output electrode 30e2 (second additional signal input/output electrodes) of the second reading chip 30D2 to the signal input/output electrodes 30e of the third reading chip 30D3. The third signal connection wiring 20e3 connects the signal input/output electrodes 30e of the fourth reading chip 30D4 to the signal input/output electrodes 30e of the fifth reading chip 30D5. The fourth signal connection wiring 20e4 connects the signal input/output electrodes 30e of the fifth reading chip 30D5 to the signal input/output electrodes 30e of the sixth reading chip 30D6. According to such a constitution, the first reading chip 30D1 can be connected to the third reading chip 30D3 via the second reading chip 30D2 by one charge generation chip 20D. Similarly, the fourth reading chip 30D4 can be connected to the sixth reading chip 30D6 via the fifth reading chip 30D5.

Second Modification Example

Figure 14:
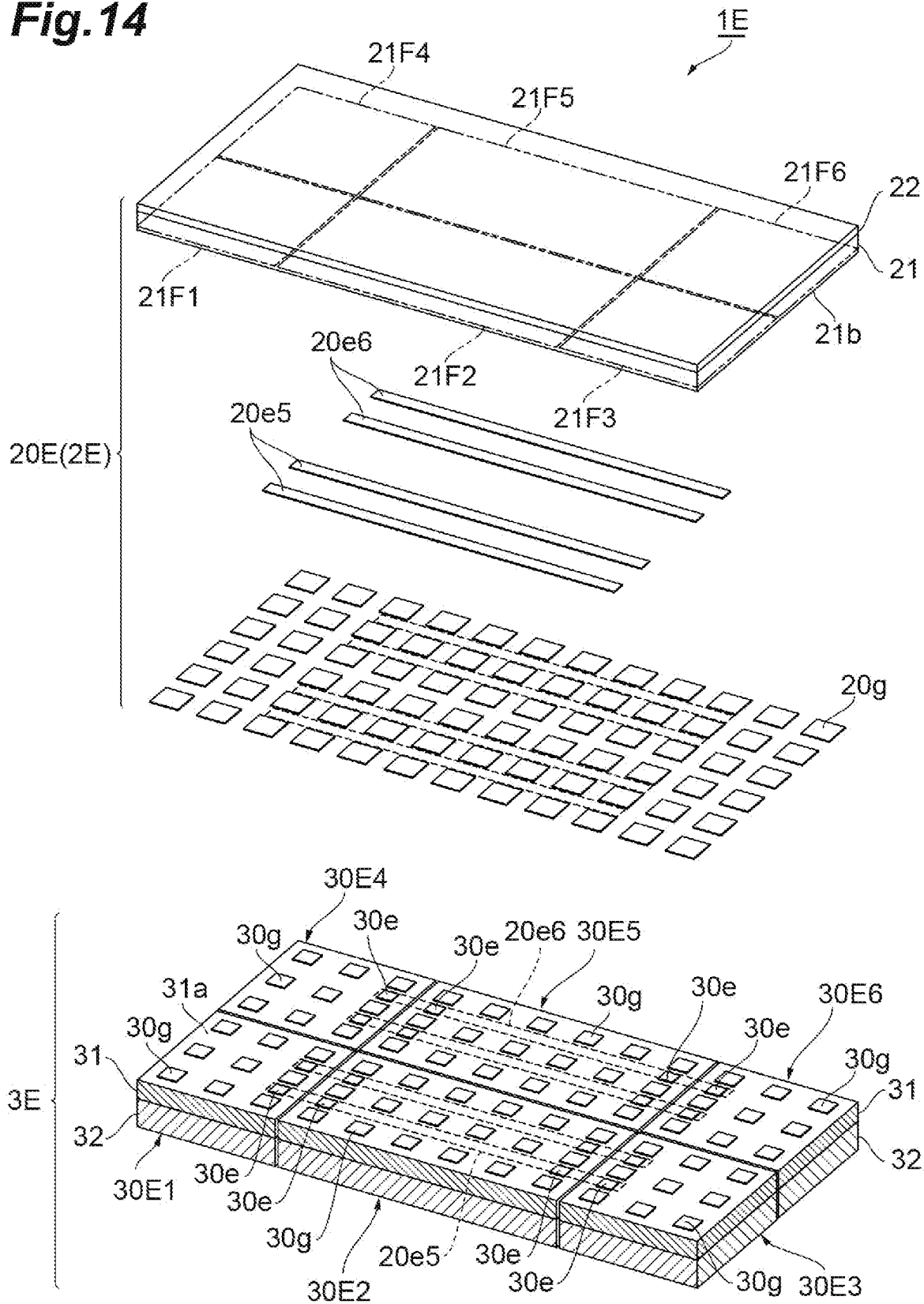
FIG. 14 is an exploded perspective view illustrating a charge generation chip and a reading chip provided in a radiation imaging device according to a second modification example.

FIG. 14 is an exploded perspective view illustrating a charge generation chip 20E and reading chips 30E1 to 30E6 provided in a radiation imaging device 1E according to a second modification example. In the radiation imaging device 1D according to the second modification example, one first signal connection wiring 20e1 electrically connects a reading chip 30K1 to a reading chip 30K2. For example, a signal connection wiring 20e5 provided in the radiation imaging device 1E according to the second modification example in FIG. 14 may extend from the first reading chip 30E1 to the third reading chip 30E3 via the second reading chip 30E2. Similarly, a signal connection wiring 20e6 may also extend from the fourth reading chip 30E4 to the sixth reading chip 30E6 via the fifth reading chip 30E5. According to this constitution, the first reading chip 30E1 can be directly connected to the third reading chip 30E3 using the signal connection wiring 20e5 by one charge generation chip 20E. Similarly, the fourth reading chip 30E4 can be directly connected to the sixth reading chip 30E6 using the signal connection wiring 20e6.

REFERENCE SIGNS LIST 1, 1A, 1B, 1C, 1D, 1E Radiation imaging device
4 Circuit board
20, 20A, 20B, 20C, 20D, 20E Charge generation chip
20e, 20f Signal connection wiring
20e2 Second signal connection wirings (additional signal connection wiring)
21F1 First output regions
21F2 Second output regions
21F3 Third output regions
21F4 Fourth output regions
20g Charge output electrode
21 Semiconductor detection portion
23 Charge rewiring layer (charge rewiring portion)
23p Pixel electrode
30e Signal input/output electrodes (first signal input/output electrodes, second signal input/output electrodes)
30e2 Signal input/output electrodes (second additional signal input/output electrodes)
30g Charge reading electrode
31 Reading rewiring layer (reading rewiring portion)
31p Rewiring electrode
32 Lead-out substrate (lead-out portion)

The invention claimed is:

1. A radiation imaging device comprising:
a charge generator that includes charge generation chips, first reading chips, and second reading chips, the charge generation chips being configured to generate charges corresponding to an energy or the number of particles of incident radiation;
a circuit board having a first one of the first reading chips and a first one of the second reading chips arranged thereon adjacent one another;
the first one of the first reading chips being configured to be electrically connected to a respective one of the charge generation chips and output a digital value based on the charges received from the respective one of the charge generation chips; and
the first one of the second reading chips being configured to be electrically connected to the respective one of the charge generation chips, and output a digital value based on the charges received from the respective one of the charge generation chips,
wherein the respective one of the charge generation chips has a charge output surface including a first output region facing the first one of the first reading chips and a second output region facing the first one of the second reading chips,
wherein the first one of the first reading chips has a first reading surface facing the charge output surface and a first signal input/output electrode provided on the first reading surface,
wherein the first one of the second reading chips has a second reading surface facing the charge output surface and a second signal input/output electrode provided on the second reading surface, and
wherein the respective one of the charge generation chips has signal connection wiring on the charge output surface thereof, the signal connection wiring straddling the first one of the first reading chips and the first one of the second reading chips, and electrically connecting the first signal input/output electrode of the first one of the first reading chips to the second signal input/output electrode of the first one of the second reading chips.

2. The radiation imaging device according to claim 1, wherein the charge generation chips each have a plurality of charge output electrodes provided on the charge output surface, and
wherein the first reading chips each have a plurality of charge reading electrodes provided on the first reading surface, facing the charge output electrodes, and electrically connected to the charge output electrodes.

3. The radiation imaging device according to claim 2, wherein the charge generation chips each include the charge output surface provided with the signal connection wirings and the charge output electrodes and have a semiconductor detection portion outputting the charges from the charge output electrodes, and
wherein the first reading chips each include the first reading surface provided with the first signal input/output electrodes and the charge reading electrodes and have a lead-out portion generating the digital value based on the charges received from the semiconductor detection portion.

4. The radiation imaging device according to claim 2, wherein the charge generation chips each have a charge rewiring portion including the charge output surface provided with the signal connection wirings and the charge output electrodes, and a semiconductor detection portion outputting the charges to the charge rewiring portion via a plurality of pixel electrodes separated from each other, wherein the first reading chips each include the first reading surface provided with the first signal input/output electrodes and the charge reading electrodes and have a lead-out portion generating the digital value based on the charges received from the charge rewiring portion, and wherein arrangement intervals between the pixel electrodes differ from arrangement intervals between the charge output electrodes.

5. The radiation imaging device according to claim 2, wherein the charge generation chips each include the charge output surface provided with the signal connection wirings and the charge output electrodes and have a semiconductor detection portion outputting the charges from the charge output electrodes, wherein the first reading chips each have a reading rewiring portion including the first reading surface provided with the first signal input/output electrodes and the charge reading electrodes, and a lead-out portion generating the digital value on the basis of the charges received from the reading rewiring portion via a plurality of rewiring electrodes separated from each other, and wherein arrangement intervals between the rewiring electrodes differ from arrangement intervals between the charge reading electrodes.

6. The radiation imaging device according to claim 2, wherein the charge generation chips each have a charge rewiring portion including the charge output surface provided with the signal connection wirings and the charge output electrodes, and a semiconductor detection portion outputting the charges to the charge rewiring portion via a plurality of pixel electrodes separated from each other, wherein the first reading chips each have a reading rewiring portion including the first reading surface provided with the first signal input/output electrodes and the charge reading electrodes, and a lead-out portion generating the digital value on the basis of the charges received from the reading rewiring portion via a plurality of rewiring electrodes separated from each other, wherein arrangement intervals between the pixel electrodes differ from arrangement intervals between the charge output electrodes, and wherein arrangement intervals between the rewiring electrodes differ from arrangement intervals between the charge reading electrodes.

7. The radiation imaging device according to claim 1 further comprising:

third reading chips adjacent to the second reading chips and configured to output digital values based on charges received from the charge generation chips, wherein a first one of the third reading chips has a third reading surface facing the charge output surface of the respective one of the charge generation chips, and a third signal input/output electrode provided on the third reading surface, wherein the charge output surface of the respective one of the charge generation chips further includes a third output region facing the third reading surface, wherein the first one of the second reading chips further has a second additional signal input/output electrode provided on the second reading surface, and wherein the respective one of the charge generation chips further has additional signal connection wiring extending from the second output region to the third output region and electrically connecting the second additional signal input/output electrode to the third signal input/output electrode.

8. The radiation imaging device according claim 1 further comprising:

third reading chips adjacent to the second reading chips and configured to output digital values based on the charges received from the charge generation chips, wherein a first one of the third reading chips has a third reading surface facing the charge output surface of the respective one of the charge generation chips and a third signal input/output electrode provided on the third reading surface, wherein the charge output surface of the respective one of the charge generation chips further includes a third output region facing the third reading surface, and wherein the signal connection wirings are provided throughout the first output region, the second output region, and the third output region, and electrically connect the first signal input/output electrode, the second signal input/output electrode, and the third signal input/output electrode to each other.

* * * * *